United States Patent
Oe et al.

(10) Patent No.: US 12,555,132 B2
(45) Date of Patent: Feb. 17, 2026

(54) SYSTEM, SERVER APPARATUS, CONTROL METHOD OF SERVER APPARATUS, AND STORAGE MEDIUM

(71) Applicant: NEC Corporation, Tokyo (JP)

(72) Inventors: Takeyoshi Oe, Tokyo (JP); Haruka Sato, Tokyo (JP); Tomohiro Yamaguchi, Tokyo (JP); Toshiro Morita, Tokyo (JP); Mami Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/723,967

(22) PCT Filed: Jan. 17, 2022

(86) PCT No.: PCT/JP2022/001306
§ 371 (c)(1),
(2) Date: Jun. 25, 2024

(87) PCT Pub. No.: WO2023/135786
PCT Pub. Date: Jul. 20, 2023

(65) Prior Publication Data
US 2025/0069105 A1 Feb. 27, 2025

(51) Int. Cl.
*G06Q 30/02* (2023.01)
*G06F 21/32* (2013.01)
(Continued)

(52) U.S. Cl.
CPC ......... *G06Q 30/0207* (2013.01); *G06F 21/32* (2013.01); *G06Q 10/02* (2013.01); *G06Q 50/12* (2013.01)

(58) Field of Classification Search
CPC ........ G06F 21/32; G06Q 10/02; G06Q 50/12; G06Q 30/02; G06Q 30/0207–30/0277
See application file for complete search history.

(56) References Cited

U.S. PATENT DOCUMENTS

| | | | |
|---|---|---|---|
| 10,698,995 B2 * | 6/2020 | Tussy | G06F 21/57 |
| 11,010,598 B2 * | 5/2021 | Uchida | G06V 10/60 |

(Continued)

FOREIGN PATENT DOCUMENTS

| | | |
|---|---|---|
| JP | 2010-277360 A | 12/2010 |
| JP | 2017-068370 A | 4/2017 |

(Continued)

OTHER PUBLICATIONS

English translation of Written opinion for PCT Application No. PCT/JP2022/001306, mailed on Mar. 29, 2022.

(Continued)

*Primary Examiner* — Thuy N Nguyen
(74) *Attorney, Agent, or Firm* — Sughrue Mion, PLLC

(57) ABSTRACT

A system includes server apparatus and business operator terminal. The server apparatus stores biometric information of users who plan to use a hotel. The authentication terminal transmits user behavior notification that includes biometric information and behavior information of person to be determined to the server apparatus. The server apparatus identifies the person to be determined among the users by matching processing. The server apparatus determines whether the identified person to be determined is hotel user who will use the hotel or who used the hotel based on time of processing of the user behavior notification. The server apparatus determines whether the identified person to be determined is target person to be rewarded based on the behavior information. When the person to be determined is the hotel user and the target person to be rewarded, the server apparatus provides the person to be determined with a reward related to the hotel.

13 Claims, 19 Drawing Sheets

(51) Int. Cl.
*G06Q 10/02* (2012.01)
*G06Q 30/0207* (2023.01)
*G06Q 50/12* (2012.01)

(56) References Cited

U.S. PATENT DOCUMENTS

| | | | | |
|---|---|---|---|---|
| 2006/0204058 | A1* | 9/2006 | Kim | G06V 40/172 |
| | | | | 382/118 |
| 2007/0036400 | A1* | 2/2007 | Watanabe | G06V 40/1376 |
| | | | | 382/124 |
| 2008/0249847 | A1* | 10/2008 | Dahlin | G07F 17/0014 |
| | | | | 705/34 |
| 2019/0180311 | A1* | 6/2019 | Chan | G06Q 30/0236 |
| 2021/0042404 | A1* | 2/2021 | Ko | G06F 21/32 |
| 2021/0279762 | A1* | 9/2021 | Eklund | G06Q 30/0226 |
| 2022/0147994 | A1* | 5/2022 | Ozono | G07C 9/00563 |
| 2022/0335513 | A1* | 10/2022 | Thompson | G06Q 10/02 |
| 2023/0084599 | A1* | 3/2023 | Gregorek | G06Q 30/0206 |
| | | | | 705/7.35 |
| 2023/0316160 | A1* | 10/2023 | Yamaguchi | G06V 40/172 |
| | | | | 705/5 |

FOREIGN PATENT DOCUMENTS

| | | | |
|---|---|---|---|
| JP | 2017-224050 | A | 12/2017 |
| JP | 2018-067201 | A | 4/2018 |
| JP | 2020-003873 | A | 1/2020 |
| JP | 6690074 | B1 * | 3/2020 |
| JP | 2020-194316 | A | 12/2020 |
| JP | 2021-018523 | A | 2/2021 |
| JP | 2021-026639 | A | 2/2021 |
| JP | 2021-043644 | A | 3/2021 |
| JP | 2021-068355 | A | 4/2021 |
| WO | WO-2022006619 | A1 * | 6/2021 |
| WO | 2022/003766 | A1 | 1/2022 |

OTHER PUBLICATIONS

International Search Report for PCT Application No. PCT/JP2022/001306, mailed on Mar. 29, 2022.
JP Office Action for JP Application No. 2022-538767, mailed on Aug. 2, 2022 with English Translation.
Yukiko Watanabe, "A close look at the cashless strategies of various companies: Which economic zone will benefit from them?", Nikkei Trendy, Nikkei BP, Mar. 4, 2021, No. 476, pp. 56-59 and English translation of the part circled in red on p. 59 thereof.

* cited by examiner

USER INFORMATION DATABASE

| USE ID | REWARD INFORMATION | BIOMETRIC INFORMATION | PERSONAL INFORMATION | | RESERVATION INFORMATION | |
|---|---|---|---|---|---|---|
| | | | NAME | | PERIOD OF STAY | |
| ID01 | DISCOUNT ON ACCOMMODATION CHARGE | FV01 | NM01 | ... | 2021/12/1 - 12/3 | ... |
| ID02 | — | FV02 | NM02 | ... | 2021/12/1 - 12/4 | ... |
| ID03 | DISCOUNT ON ACCOMMODATION CHARGE | FV03 | NM03 | ... | 2021/12/2 - 12/4 | ... |
| ID04 | — | FV04 | NM04 | ... | 2021/12/5 - 12/10 | ... |
| ID05 | — | FV05 | NM05 | ... | 2021/12/6 - 12/12 | ... |
| ID06 | DISCOUNT ON ACCOMMODATION CHARGE | FV06 | NM06 | ... | 2021/12/7 - 12/15 | ... |
| ... | ... | ... | ... | ... | ... | ... |

FIG.8

BICYCLE RENTAL

WE ACCEPT A BICYCLE RENTAL WITH THE FOLLOWING DETAILS.

MODEL FOR RENT: MOUNTAIN BIKE

RENTAL DATE: DECEMBER 1, 2021

RENTAL PERIOD: 10:00 - 16:00

RENTAL FEE: X3 YEN

:

IF YOU AGREE, PLEASE PRESS THE CONFIRMATION BUTTON.

[CONFIRM] [CANCEL]

FIG.15

SYSTEM, SERVER APPARATUS, CONTROL METHOD OF SERVER APPARATUS, AND STORAGE MEDIUM

This application is a National Stage Entry of PCT/JP2022/001306 filed on Jan. 17, 2022, the contents of all of which are incorporated herein by reference, in their entirety.

TECHNICAL FIELD

The present invention relates to a system, a server apparatus, a control method of the server apparatus, and a storage medium.

BACKGROUND ART

In recent years, services using biometric authentication (face recognition) have begun to be provided.

For example, Patent Literature 1 describes that a system that provides a service in a simple and convenient manner is provided. The system for providing a service of Patent Literature 1 includes a face image acquisition means, a storage means, a face matching means, and an output means. The face image acquisition means acquires a face image of a target person. The storage means stores face images for authentication of registered persons and information about the registered persons. The face matching means matches the face image and the face images for authentication. The output means outputs information related to the service. Furthermore, when the face matching means determines that the target person is a registered person, the output means outputs information about the registered person as service-related information.

In addition, there are systems that provide a reward (incentive) to a user in order to achieve a specific objective.

For example, Patent Literature 2 describes promoting a user to use an application on a mobile terminal. The incentive providing system of Patent Literature 2 identifies a user and enables performing an output processing to output code information that includes identification information associated with the user. The incentive providing system performs a determining processing to determine, as a condition for determining, that the code information has been read by the mobile terminal possessed by the user and that a predetermined application has been activated on at least the mobile terminal. Further, when it is determined that the condition is satisfied in the determining processing, the incentive providing system performs an incentive processing to provide a reward to the user, the user corresponding to identification information included in the code information.

Patent Literature 3 describes that an accommodation facility use management system, an accommodation facility use management method, and a program are provided that can simplify accepting a simple cleaning plan and improve an efficiency of front desk operations. The accommodation facility check-in system of Patent Literature 3 includes a determination processing unit, an acceptance processing unit, and a setting processing unit. The determination processing unit determines whether or not a user of the accommodation facility is staying at the accommodation facility for consecutive nights. When the determination processing unit determines that the user is staying at the accommodation facility for consecutive nights, the acceptance processing unit accepts an operation by the user to select either a normal cleaning plan or a simple cleaning plan for a cleaning plan of a guest room to be used by the user at a check-in terminal in which the user performs a check-in process. The setting processing unit registers the cleaning plan accepted by the acceptance processing unit in association with the guest room.

CITATION LIST

Patent Literature

[PTL 1] Japanese Unexamined Patent Application Publication No. JP2017-224050
[PTL 1] Japanese Unexamined Patent Application Publication No. JP2021-043644
[PTL 1] Japanese Unexamined Patent Application Publication No. JP2021-068355

SUMMARY OF INVENTION

Technical Problem

There exists a unique economic sphere formed by hotels, restaurants, retail stores, and the like in tourist areas and so on. In such areas, many residents work in hotels, and so on, and there is a need to revitalize the areas where hotels, restaurants, and the like operate.

In this regard, the above needs cannot be met even if the techniques disclosed in Patent Literature 1, Patent Literature 2 and Patent Literature 3 are applied. This is because Patent Literature 1 only discloses that a user is identified by biometric authentication and that a service is provided to the identified user. Furthermore, the methods of providing incentives disclosed in Patent Literature 2 and Patent Literature 3 do not lead to the revitalization of areas centered on hotels.

It is a main object of the present invention to provide a system, a server apparatus, a control method of the server apparatus, and a storage medium, which contribute to revitalizing an economy of an area including a hotel.

Solution to Problem

According to a first aspect of the present invention, there is provided a system, including: a server apparatus that stores biometric information of at least one or more users who plan to use a hotel; and a business operator terminal that is managed by an affiliated business operator that has partnership relationship with the hotel, and transmits to the server apparatus a user behavior notification including biometric information and behavior information of a person to be determined, wherein the server apparatus identifies the person to be determined among the at least one or more users by a matching processing using the biometric information included in the user behavior notification and the stored biometric information, wherein the server apparatus determines whether the identified person to be determined is a hotel user who will use the hotel after a predetermined time or who used the hotel before a predetermined time based on a time of processing of the user behavior notification, wherein the server apparatus determines whether the identified person to be determined is a target person to be rewarded based on the behavior information, and wherein the server apparatus provides the person to be determined with a reward related to the hotel when the person to be determined is the hotel user and the target person to be rewarded.

According to a second aspect of the present invention, there is provided a server apparatus, including: a storage unit that stores biometric information of at least one or more users who plan to use a hotel; a receiving unit that receives a user behavior notification including biometric information and behavior information of a person to be determined from a business operator terminal that is managed by an affiliated business operator having partnership relationship with the hotel; a target person determination unit that identifies the person to be determined among the at least one or more users by a matching processing using the biometric information included in the user behavior notification and the stored biometric information, determines whether the identified person to be determined is a hotel user who will use the hotel after a predetermined time or who used the hotel before a predetermined time based on a time of processing of the user behavior notification and determines whether the identified person to be determined is a target person to be rewarded based on the behavior information; and a reward providing unit that provides the person to be determined with a reward related to the hotel when the person to be determined is the hotel user and the target person to be rewarded.

According to a third aspect of the present invention, there is provided a control method of a server apparatus, the control method including: storing biometric information of at least one or more users who plan to use a hotel; receiving a user behavior notification including biometric information and behavior information of a person to be determined from a business operator terminal that is managed by an affiliated business operator having partnership relationship with the hotel; identifying the person to be determined among the at least one or more users by a matching processing using the biometric information included in the user behavior notification and the stored biometric information; determining whether the identified person to be determined is a hotel user who will use the hotel after a predetermined time or who used the hotel before a predetermined time based on a time of processing of the user behavior notification; determining whether the identified person to be determined is a target person to be rewarded based on the behavior information; and providing the person to be determined with a reward related to the hotel when the person to be determined is the hotel user and the target person to be rewarded.

According to a fourth aspect of the present invention, there is provided a computer-readable storage medium storing a program causing a computer mounted on a server apparatus that stores biometric information of at least one or more users who plan to use a hotel to perform processing for: receiving a user behavior notification including biometric information and behavior information of a person to be determined from a business operator terminal that is managed by an affiliated business operator having partnership relationship with the hotel; identifying the person to be determined among the at least one or more users by a matching processing using the biometric information included in the user behavior notification and the stored biometric information; determining whether the identified person to be determined is a hotel user who will use the hotel after a predetermined time or who used the hotel before a predetermined time based on a time of processing of the user behavior notification; determining whether the identified person to be determined is a target person to be rewarded based on the behavior information; and providing the person to be determined with a reward related to the hotel when the person to be determined is the hotel user and the target person to be rewarded.

Advantageous Effects of Invention

According to the individual aspects of the present invention, a system, a server apparatus, a control method of the server apparatus, and a storage medium are provided that contribute to revitalizing an economy of an area that includes a hotel. The advantageous effects of the present invention are not limited to the above advantageous effect. The present invention may provide other advantageous effects, instead of or in addition to the above advantageous effect.

BRIEF DESCRIPTION OF THE DRAWINGS

FIG. 8 is a diagram illustrating an example of a user information database according to the first example embodiment.

FIG. 15 is a diagram illustrating an example of a display of the business operator terminal according to the first example embodiment.

EXAMPLE EMBODIMENT

Figure 1:
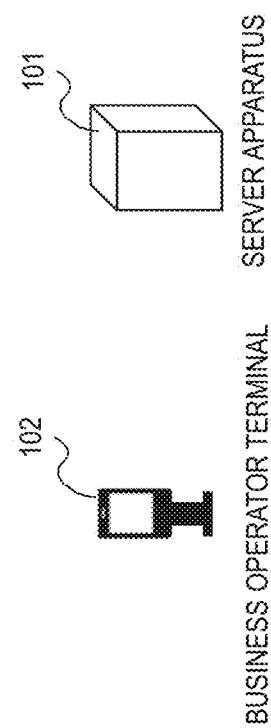
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

Figure 2:
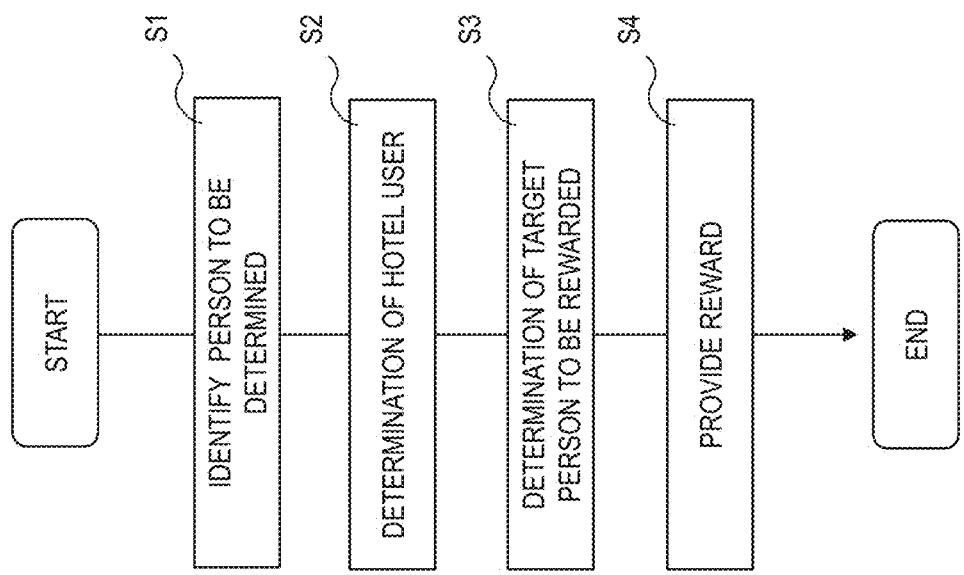
FIG. 2 is a flowchart illustrating an example of an operation of a system according to a first example embodiment.

The system according to an example embodiment includes a server apparatus 101 and a business operator terminal 102 (see FIG. 1). The server apparatus 101 stores biometric information of at least one or more users who plan to use a hotel. The business operator terminal 102 is managed by an affiliated business operator that has a partnership relationship with the hotel and transmits a user behavior notification that includes biometric information and behavior information of a person to be determined to the server apparatus 101. The server apparatus 101 identifies the person to be determined among the at least one or more users by a matching processing using the biometric information included in the user behavior notification and the stored biometric information (step S1 in FIG. 2). The server apparatus 101 determines whether the identified person to be determined is a hotel user who will use the hotel after a predetermined time or who used the hotel before a predetermined time based on a time of processing of the user behavior notification (step S2). The server apparatus 101 determines whether the identified person to be determined is a target person to be rewarded based on the behavior information (step S3). When the person to be determined is the hotel user and the target person to be rewarded, the server apparatus 101 provides the person to be determined with a reward related to the hotel (step S4).

In the above system, when the hotel user visits the affiliated business operator operating in the vicinity of the hotel to purchase a product or receive a service, a reward related to the hotel is provided to the user in accordance with the behavior of the user at the affiliated business operator. By providing the reward to the hotel user, the user (tourist) is motivated to engage in consumption behavior at the affiliated business operator in the vicinity of the hotel. In addition, the hotel provides a reward (for example, a discount on accommodation charge) when the user makes a purchase at the affiliated business operator, thereby creating an incentive for the hotel user to actively use the hotel. In other words, attractiveness of the hotel and the affiliated business operator in the vicinity of the hotel will increase, and more users (tourists) will use the hotel and the affiliated business operator. As a result, the economy of the hotel and the area around the hotel will be revitalized.

Hereinafter, specific example embodiments will be described in more detail with reference to drawings.

First Example Embodiment

Figure 3:
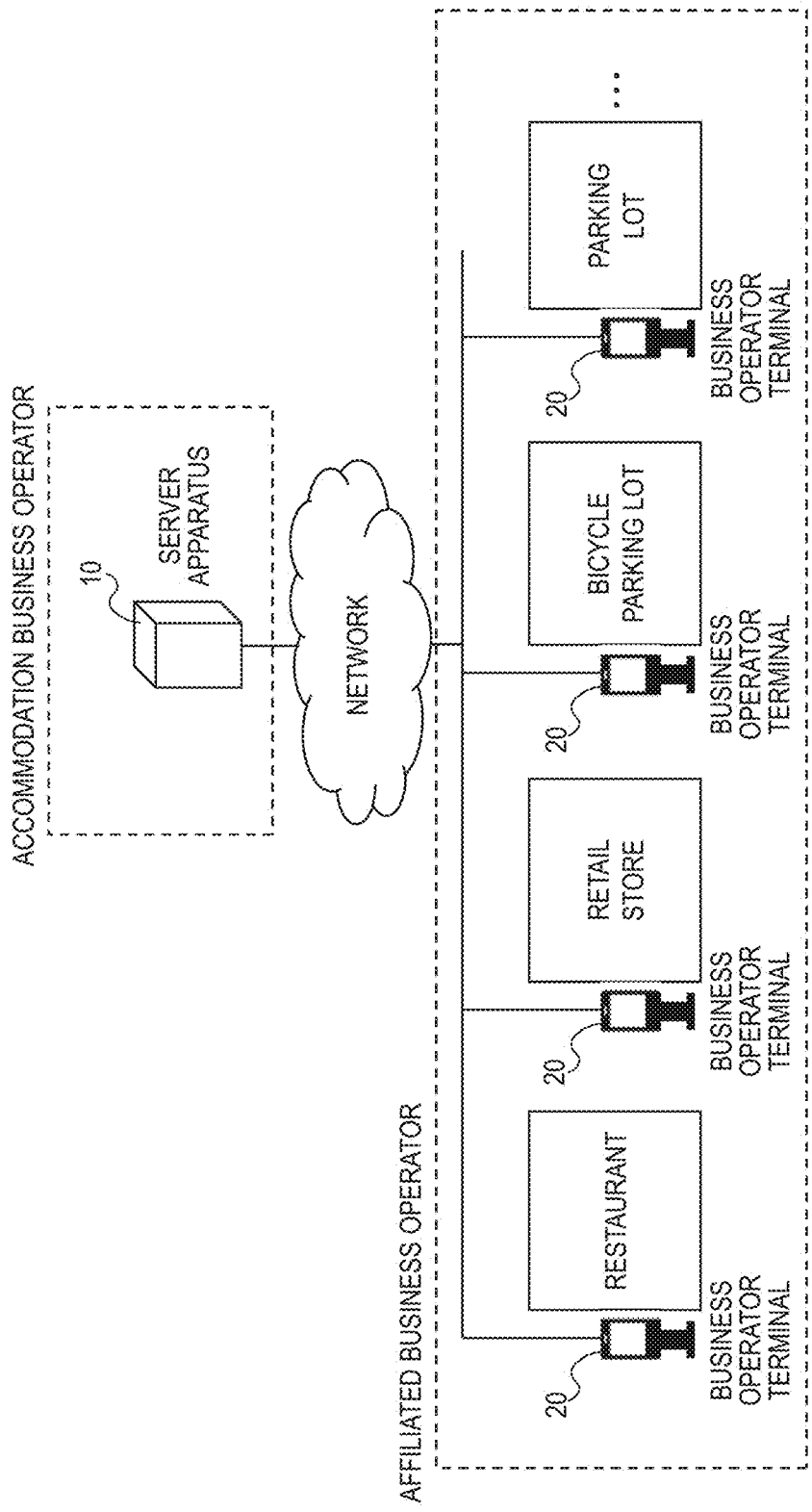
FIG. 3 is a diagram illustrating an example of a schematic configuration of an information processing system according to the first example embodiment.

A first example embodiment will be described in more detail with reference to drawings.
[System Configuration]
FIG. 3 is a diagram illustrating an example of a schematic configuration of an information processing system according to a first example embodiment. As shown in FIG. 3, the information processing system includes an accommodation business operator that manages a hotel, or the like, and an affiliated business operator that has a partnership relationship with the accommodation business operator.

Examples of affiliated business operators that have partnership relationships with the accommodation business operator include a restaurant, retail store, management company of bicycle parking lot or parking lot, resort facility (ski resort, golf course), taxi company, and so on. Alternatively, one corporate group may operate a hotel, shopping mall (a restaurant, retail store, or the like), parking lot, and the like. Even in this case, the hotel and restaurant, and so on, are in a partnership relationship.

The accommodation business operator is equipped with a server apparatus 10. The server apparatus 10 may be installed at a head office of the accommodation business operator or at the hotel, or the server apparatus 10 may be installed on a network (on a cloud). The server apparatus 10 stores biometric information of at least one or more users who plan to use the hotel.

Note that examples of the biometric information include data (feature values) calculated from physical features unique to an individual, such as a face, a fingerprint, a voiceprint, a vein, a retina, or an iris pattern of an eye. Alternatively, the biometric information may be image data such as a face image, a fingerprint image, and so on. The biometric information may be anything that includes physical characteristics of a user as information. In the present application, a case in which biometric information about a "face" of a person (a face image or a feature value generated from the face image) is used will be described.

Business operator terminals 20 are installed in facilities (affiliated business operators) around the hotel. Each business operator terminal 20 is connected to the server apparatus 10 via a network. Specifically, the server apparatus 10 and the business operator terminal 20 are connected by wired or wireless communication means and are configured to be able to communicate with each other.

The configuration of the information processing system shown in FIG. 3 is an example and is not intended to limit the configuration of the authentication system. For example, the information processing system may include a plurality of the server apparatuses 10. Moreover, the number of the affiliated business operators included in the information processing system is not intended to be limited to "4". The information processing system may include at least one or more affiliated business operators.
[Schematic Operation]
Next, schematic operation of the information processing system according to the first example embodiment will be described.

Figure 4:
FIG. 4 is a diagram illustrating an operation of the information processing system according to the first example embodiment.

When a user engages in consumption behavior, and the like, at an affiliated business operator of a hotel, the hotel provides a reward to the user in accordance with the behavior of the user.
[Reservation for Use of Hotel]
First, a user who wishes to use a hotel (for example, to stay overnight, to eat at a restaurant, and so on) makes a reservation in advance. The user operates a terminal 30 in his or her possession to register hotel user information (information about the user using the hotel) in the server apparatus 10 (see FIG. 4).

The hotel user information includes personal information of the user (name, address, and so on), biometric information (face image), reservation information, and so on. The reservation information about a user who plans to stay at the hotel includes a period of stay, grade of room, dinner menu, and so on. The reservation information about a user who will use a facility in the hotel (restaurant, wedding hall, and so on) includes a date of use of the facility (reservation date), name of the facility (for example, name of the restaurant), and details of a service (for example, a meal menu), and so on.

Note that in the following description, a user who will use a hotel after a predetermined time based on the time of determining whether or not to provide a reward to the user, or a user who used a hotel before a predetermined time based on the time of determining whether or not to provide a reward to the user, will be described as a "hotel user".

For example, the hotel user includes a user who has made a reservation for a stay at a hotel, and who is in a period of the stay including a start date of the stay (check-in date) and an end date of the stay (check-out date). In other words, a user who has made a reservation for a stay at a hotel, but has not yet checked in, is determined to be the hotel user on the day of check-in. Similarly, a user who has checked out is determined to be the hotel user on the day of check-out.

Alternatively, a user who has made a reservation to use a facility in a hotel (for example, a restaurant) is determined to be the hotel user on the day the user uses the facility. In this way, an example of the hotel user is a hotel guest or a user of a hotel facility.

<Grasp of Behavior of Target Person to be Rewarded>

When a hotel user engages in a predetermined behavior (for example, purchasing a product or receiving a service) at a business operator affiliated with a hotel, a reward may be provided to the user. For example, when the hotel user makes a purchase exceeding a predetermined amount at a retail store with which the hotel has a partnership, the hotel provides a reward to the hotel user.

Figure 5:
FIG. 5 is a diagram illustrating an operation of the information processing system according to the first example embodiment.

In this case, the user settles the payment for the purchased product using the business operator terminal 20 installed at the retail store. The business operator terminal 20 acquires biometric information (for example, a face image) of a person to be determined (a user who is determined whether or not to be a target person to be rewarded). Furthermore, the business operator terminal 20 notifies the server apparatus 10 of the acquired biometric information and behavior information that includes details of the behavior performed by the person to be determined. More specifically, the business operator terminal 20 transmits to the server apparatus 10 a "user behavior notification (notification of behavior of the person to be determined)" that includes the biometric information and the behavior information (see FIG. 5).

The server apparatus 10 performs a matching processing using the biometric information of the person to be determined and biometric information registered in advance. When the matching process is successful (when the biometric information of the person to be determined is registered), the server apparatus 10 determines whether or not the person to be determined, identified by the matching process, is the hotel user.

Specifically, when the date of processing the user behavior notification is during a period of stay at a hotel or on a day of use of a hotel, the server apparatus 10 determines that the user (the person to be determined) who has made a consumption behavior, or the like, at the affiliated business operator is the hotel user.

Next, the server apparatus 10 determines whether or not the behavior of the person to be determined is eligible for a reward. Specifically, the server apparatus 10 determines whether or not the behavior of the person to be determined is a behavior that is eligible for the reward based on the behavior information included in the user behavior notification.

When the matching processing is successful, the person to be determined is the hotel user, and the behavior of the person to be determined meets a criteria for providing a reward, the server apparatus 10 sets the person to be determined as a "target person to be rewarded". When the matching processing fails, the person to be determined is not the hotel user, or the behavior of the person to be determined does not meet the criteria for providing the reward, the server apparatus 10 does not treat the person to be determined as the "target person to be rewarded".

The server apparatus 10 provides a reward related to the hotel to the target person to be rewarded. The reward to be provided may be determined in advance, or the reward to be provided may be determined in accordance with the behavior of the person to be determined and the like. For example, a reward such as a discount on accommodation fees may be given to the user (the user of the business operator that has the partnership relationship with the hotel).

In this way, the business operator terminal 20 is managed by an affiliated business operator that has partnership relationship with a hotel, and transmits to the server apparatus 10 a user behavior notification that includes biometric information and behavior information of a person to be determined (a user who is determined whether or not to be a target person to be rewarded). The server apparatus 10 identifies the person to be determined from among at least one or more users by performing a matching processing using the biometric information included in the user behavior notification and biometric information stored in advance. The server apparatus 10 determines whether the identified person to be determined is the hotel user or not. The server apparatus 10 determines whether or not the person to be determined is the target person to be rewarded based on the behavior information of the person to be determined. When the person to be determined is the hotel user and the target person to be rewarded, the server apparatus 10 provides a reward related to the hotel to the person to be determined.

Next, details of the individual apparatuses included in the information processing system according to the first example embodiment will be described.

[Server Apparatus]

Figure 6:
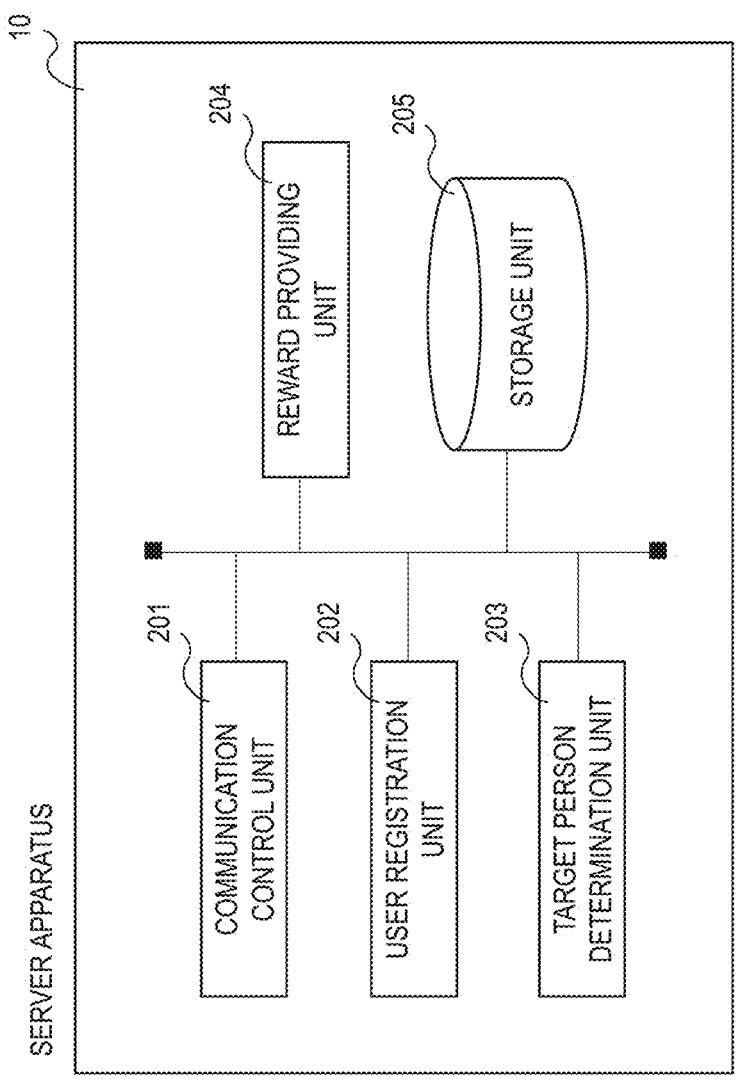
FIG. 6 is a diagram illustrating an example of a processing configuration of a server apparatus according to the first example embodiment.

FIG. 6 is a diagram illustrating an example of a processing configuration (processing modules) of the server apparatus 10 according to the first example embodiment. Referring to FIG. 6, the server apparatus 10 includes a communication control unit 201, a user registration unit 202, a target person determination unit 203, a reward providing unit 204, and a storage unit 205.

The communication control unit 201 is means for controlling communication with other apparatuses. For example, the communication control unit 201 receives data (packets) from the business operator terminal 20. In addition, the communication control unit 201 transmits data to the business operator terminal 20. The communication control unit 201 gives data received from other apparatuses to other processing modules. The communication control unit 201 transmits data acquired from other processing modules to other apparatuses. In this way, other processing modules transmit and receive data to and from other apparatuses via the communication control unit 201. The communication control unit 201 includes a function as a receiving unit that receives data from other apparatuses and a function as a transmitting unit that transmits data to other apparatuses.

The user registration unit 202 is means for registering hotel user information for a user who uses a hotel. The user information registration unit 202 acquires "hotel user information" from the user who plans to use the hotel. For example, the user information registration unit 202 acquires hotel user information from the terminal 30 owned by a user who wishes to use the hotel.

Figure 7:
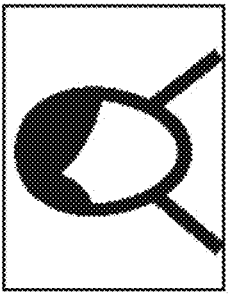
FIG. 7 is a diagram illustrating an example of a display of a terminal according to the first example embodiment.

For example, the user registration unit 202 displays a GUI (Graphical User Interface) or an input form for acquiring hotel user information on the terminal 30 and acquires the hotel user information. For example, the user registration unit 202 displays the GUI as illustrated in FIG. 7 on the terminal 30 when the user makes a reservation for the hotel.

The user registration unit 202 acquires personal information of the user (name, address, gender, date of birth, contact information, account information, and so on), biometric information (for example, face image), reservation information (period of stay, room grade, dinner menu, and so on), and so on as "hotel user information".

When the user information registration unit 202 acquires the hotel user information, the user registration unit 202 generates a user ID to identify the user. The user ID may be any information as long as the user ID uniquely identifies the hotel user (reservation holder, guest). For example, the user registration unit 202 may number a unique value each time the hotel user information is registered and use the value as the user ID.

The user registration unit 202 generates a feature value that characterizes a face image from the face image registered by the user (a feature vector consisting of plurality of feature values). Note that since an existing technology can be used to generate the feature values, a detailed description thereof will be omitted. For example, the user registration unit 202 extracts eyes, nose, mouth, and so on as feature points from the face image. Next, the user registration unit 202 calculates the location of an individual feature point and the distance between feature points as the feature values and generates the feature vector formed by the plurality of feature values (vector information that characterizes the face image).

The user information registration unit 202 registers the generated user ID, biometric information (feature value), personal information, reservation information, and so on in a user information database (see FIG. 8). As shown in FIG. 8, the user information database stores the user ID, reward information, biometric information, personal information, and reservation information in association with each other. Note that the reward information is information for managing a reward to be provided to the hotel user.

The user information database shown in FIG. 8 is an example and is not intended to limit the items to be stored. For example, a face image may be registered in the user information database as biometric information instead of or in addition to the feature value generated from the face image.

The target person determination unit 203 is a means for determining whether or not a user (a person to be determined) who has performed a behavior at an affiliated business operator of a hotel is a target person to be rewarded. The target person determination unit 203 processes a user behavior notification received from the business operator terminal 20 installed at the affiliated business operator.

Figure 9:
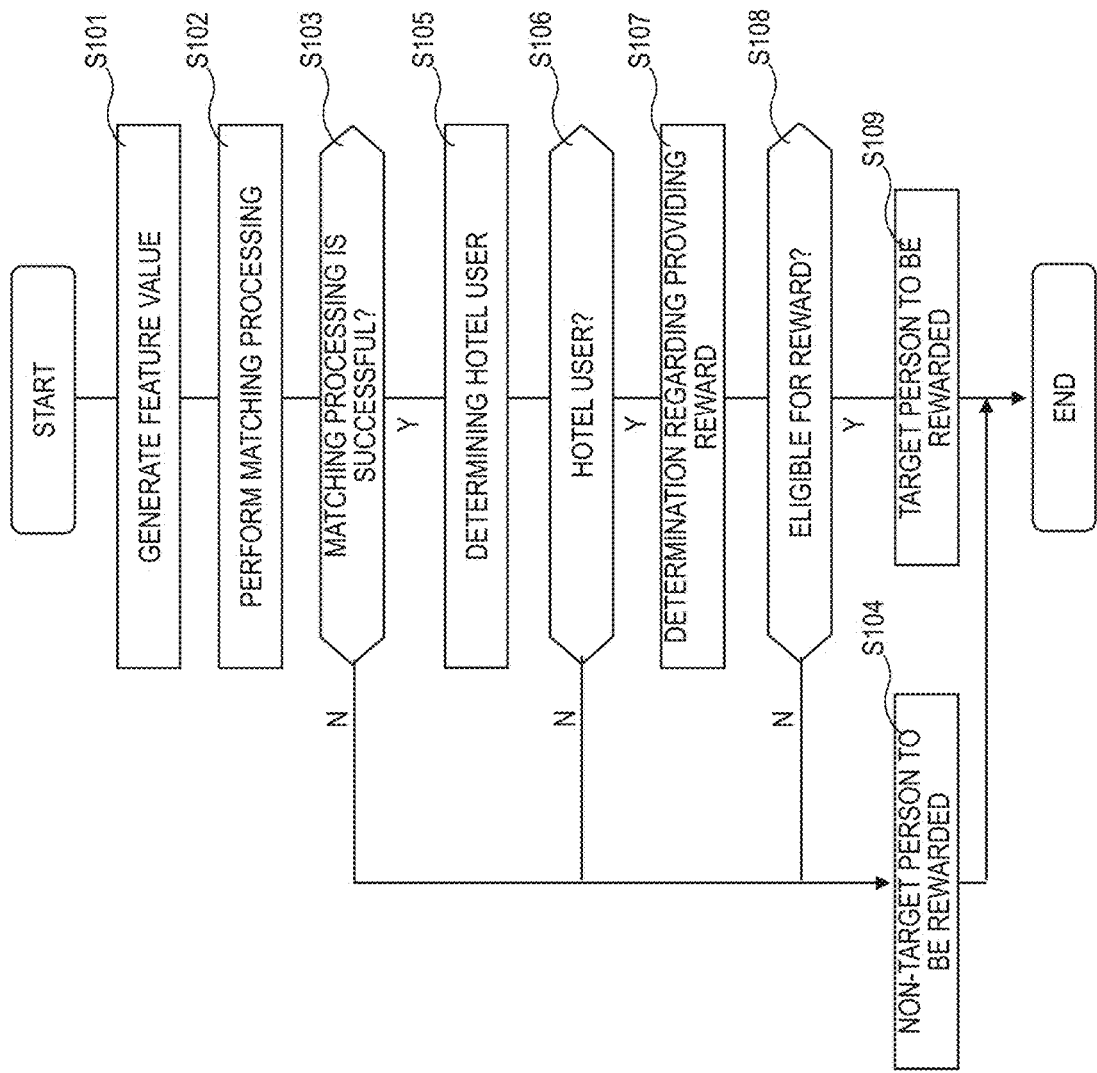
FIG. 9 is a flowchart illustrating an example of an operation of a target person determination unit according to the first example embodiment.

FIG. 9 is a flowchart illustrating an example of an operation of the target person determination unit 203 according to the first example embodiment. Referring to FIG. 9, the operation of the target person determination unit 203 will be described.

Since the user behavior notification includes a face image of a person to be determined, the target person determination unit 203 extracts the face image from the user behavior notification. The target person determination unit 203 generates a feature value from the extracted face image (step S101).

The target person determination unit 203 sets the feature value generated based on the face image acquired from the business operator terminal 20 as a target for matching, and performs a matching processing between the feature value and feature values registered in the user information database (step S102). More specifically, the target person determination unit 203 sets the above generated feature value (feature vector) as the target for matching and performs 1-to-N matching (N is a positive integer, and the same applies to the following description) between the target for matching and a plurality of feature values that are registered in the user information database.

The target person determination unit 203 calculates a similarity between the feature value to be matched and each of the plurality of feature values on the registration side. For the individual similarity, the chi-squared distance, the Euclidean distance, or the like may be used. A longer distance represents a lower similarity, and a shorter distance represents a higher similarity.

The target person determination unit 203 determines that the matching processing has been successful when there exists a feature value whose similarity between the feature value among the plurality of feature values registered in the user information database and the feature value of the target to be matched is greater than a predetermined value. When the above feature value does not exist, the target person determination unit 203 determines that matching processing has failed.

When the matching processing fails (step S103, No branch), the target person determination unit 203 sets "non-target person to be rewarded" as the result of determination (step S104).

When the matching processing is successful (step S103, Yes branch), the target person determination unit 203 identifies a user with a highest similarity calculated during the matching processing, and determines whether or not the identified user is the hotel user (determining the hotel user; step S105).

For example, the target person determination unit 203 checks a period of stay of the identified user (person to be determined) and determines whether or not the date of processing of the user behavior notification is included in the period of stay. When the date of processing of the user behavior notification is included in the period of stay, the target person determination unit 203 determines that the person to be determined is the hotel user. When the date of processing of the user behavior notification is not included in the period of stay, the target person determination unit 203 determines that the person to be determined is the non-hotel user.

Alternatively, the target person determination unit 203 determines that the person to be determined is the hotel user when the scheduled date of use of the hotel (date of reservation at a restaurant, and so on) of the person to be determined identified by the matching processing matches the date of processing the user behavior notification.

When the person to be determined is not the hotel user (step S106, No branch), the target person determination unit 203 sets "non-target person to be rewarded" as the result of authentication (step S104).

When the person to be determined is the hotel user (step S106, Yes branch), the target person determination unit 203 determines whether or not the behavior of the person to be determined is eligible for a reward (determination regarding providing a reward; step S107). Note that a specific example of determining whether or not the behavior of the person to be determined is eligible for a reward will be described below.

When the behavior of the person to be determined is not eligible for the reward (step S108, No branch), the target person determination unit 203 sets "non-target person to be rewarded" as the result of determination (step S104).

When the behavior of the person to be determined is eligible for the reward (step S108, Yes branch), the target person determination unit 203 sets "target person to be rewarded" as the result of determination (step S104).

<Specific Examples of Behaviors for which a Rewards is Provided>

Next, specific examples of behavior for which a reward is provided to the hotel user will be described.

<Payment Exceeding a Predetermined Amount>

The target person determination unit 203 determines that a person to be determined is the "target person to be rewarded" when the person to be determined has made a payment exceeding a predetermined amount to an affiliated business operator. In this case, the target person determination unit 203 performs a threshold processing on the amount of payment included in behavior information acquired from the business operator terminal 20, and determines whether or not the behavior of the person to be determined is eligible for a reward.

In this way, the target person determination unit 203 may determine whether or not the person to be determined is the target person to be rewarded based on the amount of money that the person to be determined pays when purchasing a product or receiving a service from the affiliated business operator.

<Ecological Activities>

When a person to be determined performs an environmentally friendly behavior (ecological activity), the target person determination unit 203 determines that the person to be determined is the "target person to be rewarded".

For example, the target person determination unit 203 sets a person to be determined as the target person to be rewarded when the person to be determined uses a bicycle instead of traveling by a car when sightseeing in the vicinity of a hotel. Specifically, when the target person determination unit 203 acquires behavior information of "renting a bicycle" from the business operator terminal 20 installed at a bicycle parking lot, the target person determination unit 203 sets the person to be determined who has performed the behavior as the target person to be rewarded.

In this way, the target person determination unit 203 may determine that the person to be determined is the target person to be rewarded when the person to be determined has received the bicycle rental from the affiliated business operator.

Alternatively, the target person determination unit 203 sets a person to be determined as the target person to be rewarded when the person to be determined does not use a private car, or the like, but uses a shuttle bus, or the like, when traveling to a tourist site or the like. Specifically, when the target person determination unit 203 acquires behavior information of "boarding a shuttle bus" from the business operator terminal 20 installed at a shuttle bus stop, the target person determination unit 203 sets the person to be determined who has performed the behavior as the target person to be rewarded.

For example, the target person determination unit 203 sets a person to be determined as the "target person to be rewarded" who parks his or her car in a large parking area (vacant lot) around a highway interchange and boards the shuttle bus from the parking area.

In this way, the target person determination unit 203 may determine that the person to be determined is the target person to be rewarded when the person to be determined uses the shuttle bus.

Alternatively, when a person to be determined refuses to use a plastic bag at an affiliated business operator of the hotel (for example, a retail store), the target person determination unit 203 sets the person to be determined as the target person to be rewarded. Specifically, when the target person determination unit 203 acquires behavior information of "no use of a plastic bag" from the business operator terminal 20 installed at the retail store, the target person determination unit 203 sets the person to be determined who has performed the behavior as the target person to be rewarded.

Alternatively, when a person to be determined purchases an ecology-related product at a retail store affiliated with the hotel, the target person determination unit 203 sets the person to be determined as the target person to be rewarded. Specifically, when the target person determination unit 203 acquires behavior information of "purchasing an ecology-related product" from the business operator terminal 20 installed at the retail store, the target person determination unit 203 sets the person to be determined who has performed the behavior as the target person to be rewarded.

For example, when a person to be determined purchases a product that is close to its expiration date at a souvenir store near the hotel, the person to be determined is provided with a reward.

In this way, the target person determination unit 203 may determine whether or not a person to be determined is the target person to be rewarded based on a type of product purchased by the person to be determined from an affiliated business operator. For example, the target person determination unit 203 may determine that the person to be determined is the target person to be rewarded when the person to be determined has purchased a predetermined ecology-related product.

As described above, the target person determination unit 203 grasps behavior of the hotel user using the behavior information notified from the business operator terminal 20 installed at the affiliated business operator of the hotel. The target person determination unit 203 determines whether or not to provide a reward to the hotel user based on the behavior that the target person determination unit 203 has grasped.

The reward providing unit 204 is a means for providing a reward to the target person to be rewarded. The reward providing unit 204 may provide a predetermined reward to the target person to be rewarded.

For example, the reward providing unit 204 provides a reward such as a discount on accommodation charge, an extension of check-out time, an upgrade of guest room, a free drink in guest room, an upgrade of food provided, an addition of amenities (bath additives, or the like), and so on. Alternatively, the reward providing unit 204 may provide the reward for use of a club floor, club lounge, fitness area (gym, pool, or the like), spa area, and so on. Alternatively, the reward providing unit 204 may provide the reward of having luggage (for example, souvenirs, ski equipment, golf equipment, outfits worn at a wedding, or the like) delivered to a home. The reward providing unit 204 stores the content of the reward provided by reward providing unit 204 in a reward information field of an entry of the target person to be rewarded (an entry in the user information database).

The reward providing unit 204 provides the reward to the hotel user at an appropriate time in accordance with the determined reward.

Figure 10:
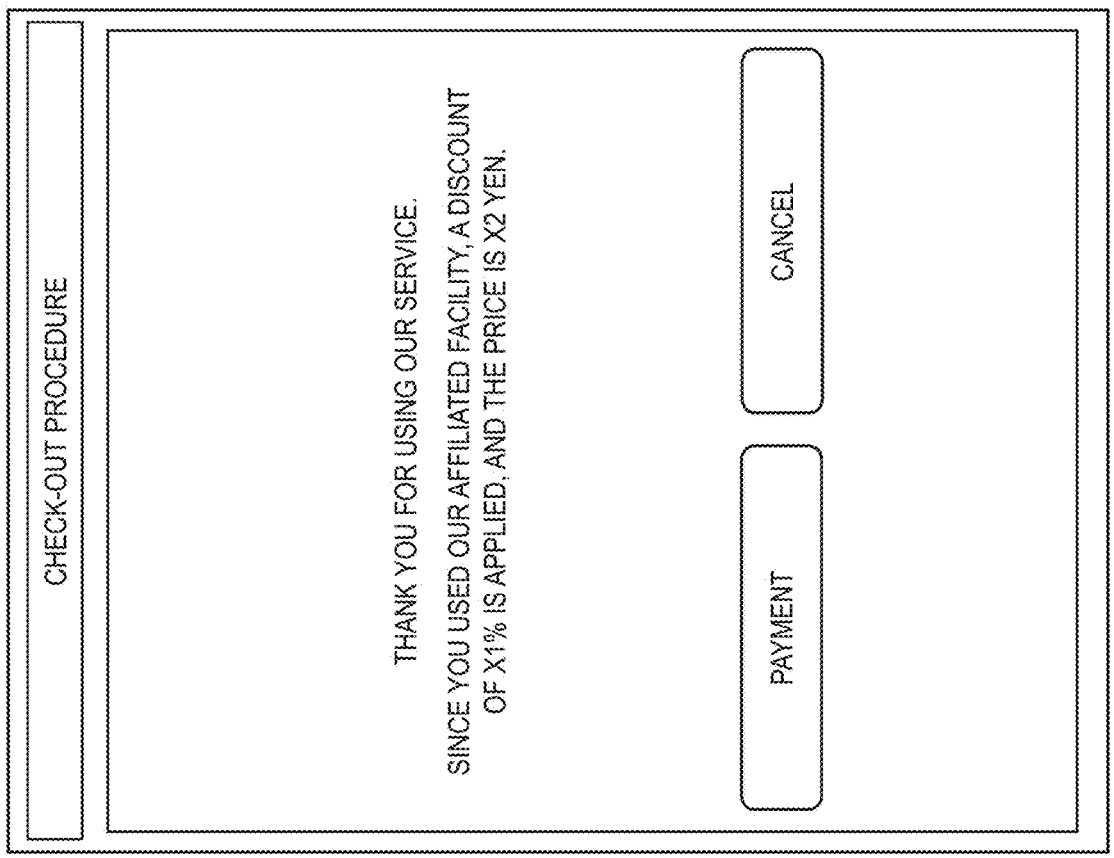
FIG. 10 is a diagram illustrating an operation of a reward providing unit according to the first example embodiment.

For example, when the reward providing unit 204 provides the "discount on accommodation charge" as a reward, the reward providing unit 204 presents the discounted charge to the user at the time of check-out of the user. For example, during the check-out procedure using a terminal installed at a lobby of the hotel, or the like, the reward providing unit 204 makes a display on the terminal as shown in FIG. 10.

Alternatively, when the reward providing unit 204 provides the "extension of check-out time", "upgrade of guest room" and "free drink in guest room", and so on, the reward providing unit 204 notifies the terminal 30 of the target person to be rewarded that these rewards have been provided.

Figure 11:
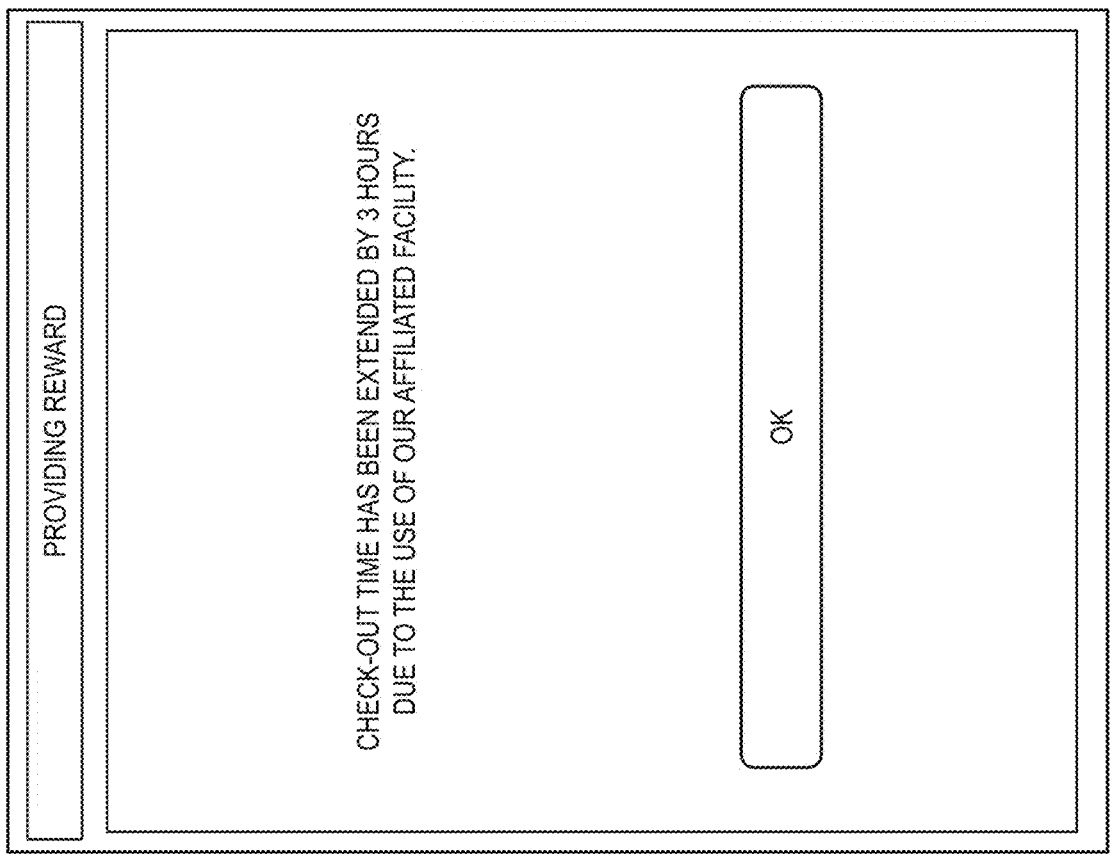
FIG. 11 is a diagram illustrating an example of a display of a terminal according to the first example embodiment.

For example, the terminal 30 notifies the user of the fact that a reward has been provided by the hotel by making a display as shown in FIG. 11.

Alternatively, when the reward providing unit 204 provides the "upgrade of food provided" and "addition of amenities", and so on as a reward, the reward providing unit 204 notifies (instructs) a staff member in the hotel to provide these rewards. In addition, the reward providing unit 204 may notify the terminal 30 of the user that the above rewards have been provided.

The reward providing unit 204 may determine a reward to be provided in accordance with reservation information of a person to be determined. In other words, since the user information database stores biometric information of a user and reservation information regarding a hotel reservation, the reward providing unit 204 may determine a reward to be provided to the target person to be rewarded based on the reservation information of the identified person to be determined by a matching processing.

For example, the reward providing unit 204 may change a type of reward to be provided or change a degree of reward (for example, discount amount) in accordance with the length of the stay. For example, the reward providing unit 204 may set a larger discount amount for the target person to be rewarded with a longer period of stay and a smaller discount amount for the target person to be rewarded with a shorter period of stay.

Alternatively, the reward providing unit 204 may provide a discount on the accommodation charge as a reward to the target person to be rewarded for a longer period of stay, and may provide the extension of check-out time as the reward to the target person to be rewarded for a shorter period of stay.

The reward providing unit 204 may determine a reward to be provided in accordance with behavior information of the target person to be rewarded.

For example, the reward providing unit 204 may change the type and content of a reward to be provided based on amount of money paid to the retail store, time spent using a rental bicycle (distance traveled), type of ecology-related product, and the like. Specifically, the reward providing unit 204 may change a discount rate for the accommodation charge or the type of reward to be provided, in accordance with the behavior of the target person to be rewarded. For example, the reward providing unit 204 may increase the discount rate provided to the user (target person to be rewarded) when the user has rented the bicycle for a longer period of time or when the user has purchased an expensive product.

The reward providing unit 204 may provide "point" for the behavior of the target person to be rewarded and determine a reward to be provided in accordance with a total amount of the provided points. For example, the reward providing unit 204 may provide points such as "1 point" for consumption behavior at the affiliated business operator and "3 points" for an ecological activity, and the reward to be provided may be determined in accordance with the total amount of points provided. For example, the reward providing unit 204 may check the total amount of points when the user checks out, and determine the discount rate for the accommodation charge.

Alternatively, the reward providing unit 204 may allow a user to select a reward to be provided by the hotel. For example, the reward providing unit 204 may notify the terminal 30 of the user of options that the user can select, such as "discount on accommodation charge", "upgrade of guest room," and so on, and acquire the reward that the user wishes to receive.

Figure 12:
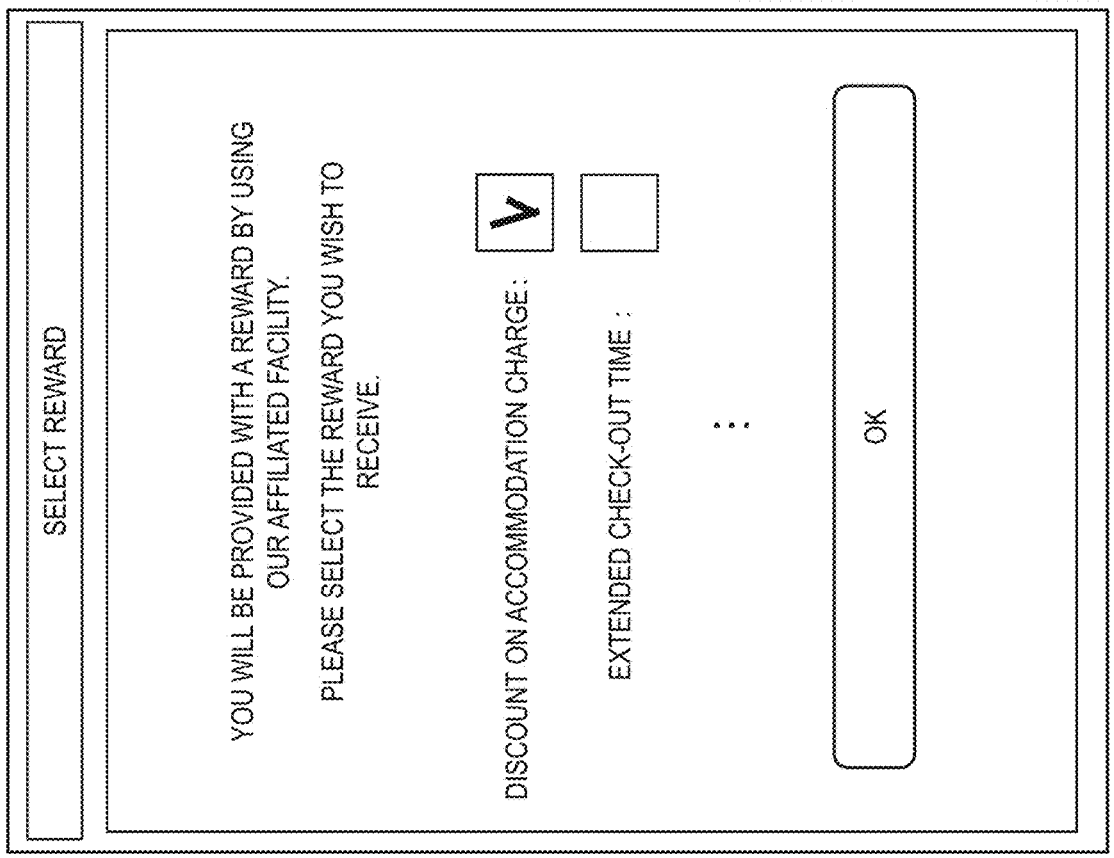
FIG. 12 is a diagram illustrating an example of a display of the terminal according to the first example embodiment.

For example, terminal 30 displays the GUI shown in FIG. 12 and acquires the reward that the user wishes to receive. The terminal 30 notifies the server apparatus 10 (the reward providing unit 204) of the acquired reward. The reward providing unit 204 performs a processing in accordance with the acquired reward.

The storage unit 205 is means for storing information necessary for an operation of the server apparatus 10. The user information database is established in the storage unit 205. The storage unit 205 stores biometric information of at least one or more users who are scheduled to use the hotel.

<Business Operator Terminal>

Figure 13:
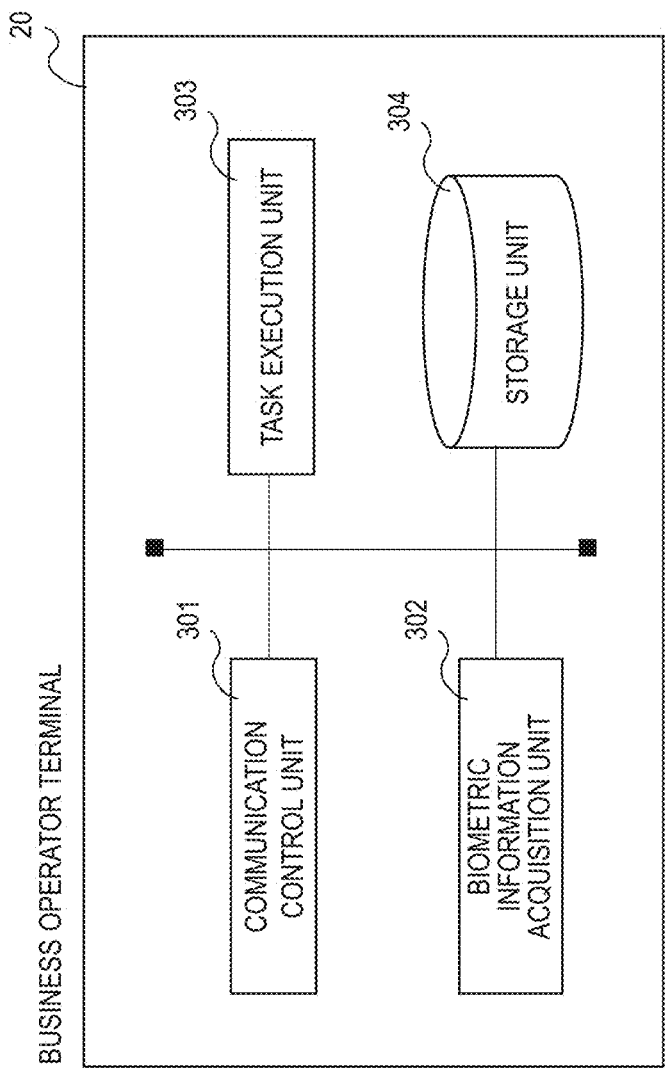
FIG. 13 is a diagram illustrating an example of a processing configuration of a business operator terminal according to the first example embodiment.

FIG. 13 is a diagram illustrating an example of a processing configuration (processing modules) of the business operator terminal 20. Referring to FIG. 13, the business operator terminal 20 includes a communication control unit 301, a biometric information acquisition unit 302, a task execution unit 303, and a storage unit 304.

The communication control unit 301 is means for controlling communication with other apparatuses. For example, the communication control unit 301 receives data (packets) from the server apparatus 10. In addition, the communication control unit 301 transmits data to the server apparatus 10. The communication control unit 301 gives data received from other apparatuses to other processing modules. The communication control unit 301 transmits data acquired from other processing modules to other apparatuses. In this way, other processing modules transmit and receive data to and from other apparatuses via the communication control unit 301. The communication control unit 301 includes a function as a receiving unit that receives data from other apparatuses and a function as a transmitting unit that transmits data to other apparatuses.

The biometric information acquisition unit 302 is means for controlling a camera device (camera device included in the business operator terminal 20) and acquiring biometric information (for example, a face image) of a person to be determined. The biometric information acquisition unit 302 takes an image in front of the own apparatus periodically or at predetermined timing. Alternatively, the biometric information acquisition unit 302 takes an image in front of the own apparatus in accordance with an instruction from the task execution unit 303.

The biometric information acquisition unit 302 determines whether or not the acquired image includes a human face image, and when the face image is included in the acquired image, the biometric information acquisition unit 302 extracts the face image from the acquired image data.

An existing technique can be used for the face image detection and extraction processing performed by the biometric information acquisition unit 302, and therefore, detailed description thereof will be omitted. For example, the biometric information acquisition unit 302 may extract a face image (a face area) from the image data by using a learning model learned by a CNN (Convolutional Neural Network).

Alternatively, the biometric information acquisition unit 302 may extract a face image by using a technique such as template matching.

The biometric information acquisition unit 302 gives the extracted face image to the task execution unit 303.

The task execution unit 303 is means for executing (realizing) a task assigned to the business operator terminal 20 of each affiliated business operator.

The task execution unit 303 transmits to the server apparatus 10 a user behavior notification including biometric information (for example, a face image) and behavior information of a person to be determined.

The task execution unit 303 performs an operation in accordance with a function of the business operator terminal 20 installed at each affiliated business operator. For example, the task execution unit 303 of the business operator terminal 20 installed at the retail store performs payment for a product purchased by the user, and so on. Alternatively, the task execution unit 303 of the business operator terminal 20 installed at the bicycle parking lot or parking lot accepts a request for bicycle rental or performs a boarding procedure for the shuttle bus.

A detailed description of the function of the task execution unit 303 in accordance with the function of the business operator terminal 20 is omitted since it is different from the purpose of the present application. Operations of the task execution unit 303 regarding transmitting a user information notification will be described below.

Figure 14:
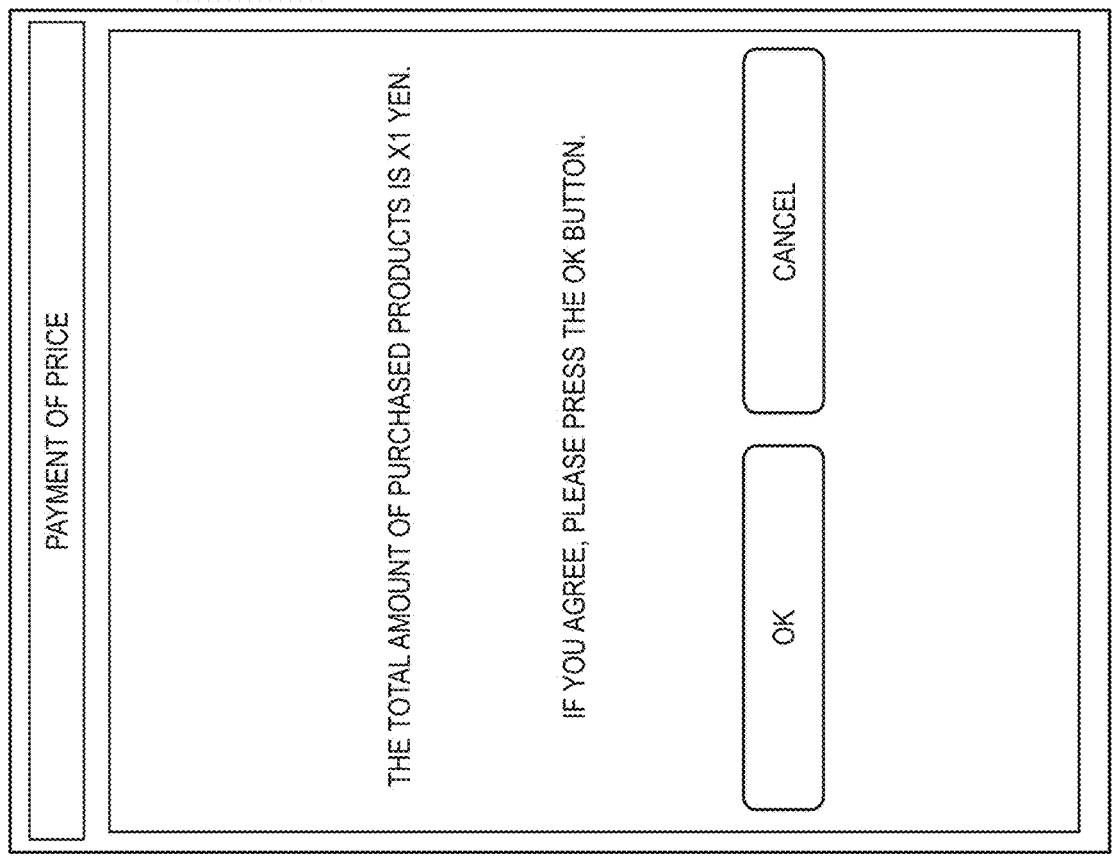
FIG. 14 is a diagram illustrating an example of a display of the business operator terminal according to the first example embodiment.

The task execution unit 303 of the business operator terminal 20 installed at the retail store or the like displays the GUI (Graphical User Interface) as shown in FIG. 14, and acquires biometric information of the user (face image) when the user has completed the payment of the purchase. Specifically, the task execution unit 303 instructs the biometric information acquisition unit 302 to acquire the biometric information when the "OK" button shown in FIG. 14 is pressed.

Moreover, the task execution unit 303 generates behavior information that includes details of the payment. Specifically, the task execution unit 303 generates the behavior information that includes total payment amount, details of purchased products, and so on. Alternatively, when the user purchases a product that is managed as an ecology-related product (for example, a product that is close to its expiration date), the task execution unit 303 generates the behavior information that clearly indicates the fact. More specifically, the task execution unit 303 generates the behavior information in which "purchase ecology-related product" is described.

In addition, the task execution unit 303 generates the behavior information in which "no plastic bag use" is described when the user offers not to use a plastic bag.

The task execution unit 303 transmits a user behavior notification that includes the acquired biometric information and the generated behavior information to the server apparatus 10.

The task execution unit 303 of the business operator terminal 20 installed at the bicycle parking lot (bicycle rental business operator) displays the GUI as shown in FIG. 15 and requests the user to confirm conditions, and so on, regarding renting a bicycle. When the user agrees to the conditions (when the "Confirm" button is pressed), the task execution unit 303 instructs the biometric information acquisition unit 302 to acquire biometric information.

Furthermore, the task execution unit 303 generates behavior information based on the conditions agreed to by the user (e.g., rental fee, rental period, type of bicycle rented, and so on). For example, the task execution unit 303 generates the behavior information that includes the rental date, fee, period of rental, type of bicycle, and so on.

The task execution unit 303 transmits a user behavior notification that includes the acquired biometric information and the generated behavior information to the server apparatus 10.

The task execution unit 303 of the business operator terminal 20 installed at the shuttle bus stop reads information on a ticket presented by a user. For example, the task execution unit 303 reads information of the ticket from a two-dimensional barcode displayed on the terminal 30 of the user.

Figure 16:
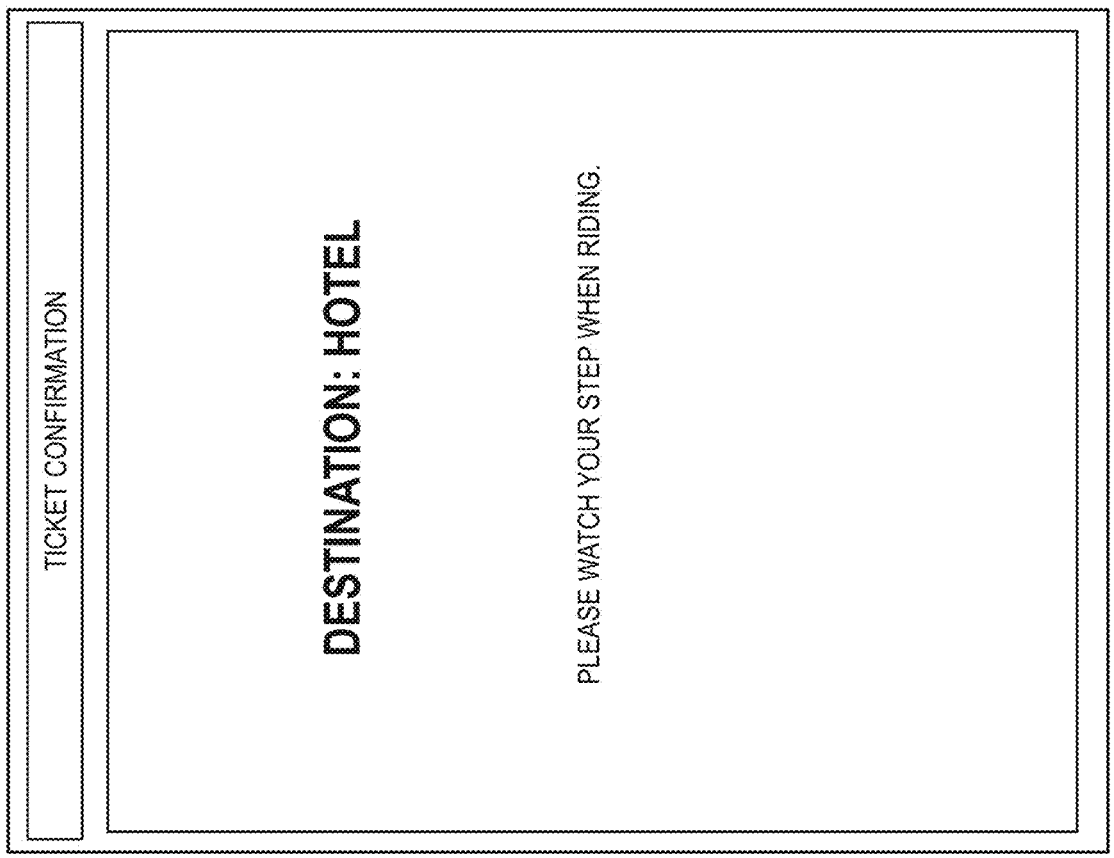
FIG. 16 is a diagram illustrating an example of a display of the business operator terminal according to the first example embodiment.

When the ticket is legitimate (when the user is eligible to board the shuttle bus), the task execution unit 303 displays a message encouraging the user to board the bus along with the destination of the shuttle bus, and so on (see FIG. 16). Before or after the display shown in FIG. 16, the task execution unit 303 instructs the biometric information acquisition unit 302 to acquire biometric information of the user.

The task execution unit 303 generates behavior information that includes a date of the shuttle bus service, departure time, departure location, destination, fare, and so on.

The task execution unit 303 transmits a user behavior notification including the acquired biometric information and the generated behavior information to the server apparatus 10.

The storage unit 304 is means for storing information necessary for the operation of the business operator terminal 20.

[Terminal]

Examples of the terminal 30 include a mobile terminal device such as a smartphone, a mobile phone, a game console, a tablet, and so on. The terminal 30 can be any equipment or device as long as the terminal 30 can accept an operation by a user and can communicate with the server apparatus 10, and so on. Further, since the configuration, and so on, of the terminal 30 is obvious to those skilled in the art, a detailed description will be omitted.

[System Operation]

Figure 17:
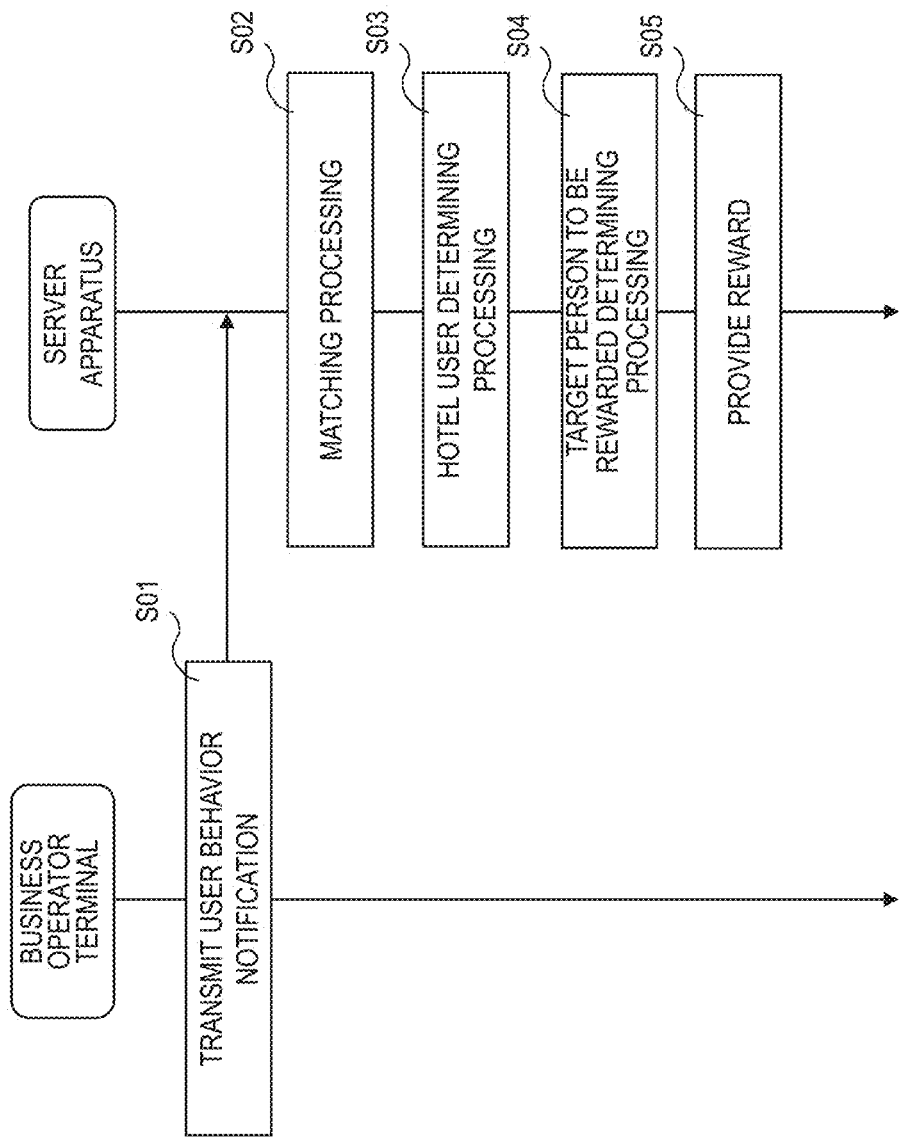
FIG. 17 is a sequence diagram illustrating an example of an operation in the information processing system according to the first example embodiment.

Next, operations of the information processing system according to the first example embodiment will be described. FIG. 17 is a sequence diagram illustrating an example of an operation in the information processing system according to the first example embodiment.

When an affiliated business operator provides a service, or the like, to a user, the business operator terminal 20 generates behavior information in accordance with the provided service, or the like. The business operator terminal 20 acquires biometric information of the purchaser (the authenticated person) and transmits a user behavior notification including the biometric information and behavior information to the server apparatus 10 (step S01).

The server apparatus 10 receives the user behavior notification and performs a matching processing using the biometric information that includes in the user behavior notification (step S02). When the matching processing is successful and a person to be determined is identified, the server apparatus 10 performs a determining processing to determine whether or not the person to be determined is the hotel user (step S03).

When the person to be determined is determined to be the hotel user, the server apparatus 10 further performs a determining processing regarding whether or not behavior of the person to be determined is eligible to be provided with a reward (determining processing to be the target person to be rewarded) (step S04).

When the person to be determined is the target person to be rewarded, the server apparatus 10 provides a reward to the person to be determined (step S05).

As described above, the server apparatus 10 identifies a person to be determined who has visited an affiliated business operator of a hotel by biometric authentication in the information processing system according to the first example embodiment. The server apparatus 10 determines whether or not the person to be determined is the hotel user and whether or not the person to be determined has engaged in behavior that provides a reward to the person to be determined at the affiliated business operator. When the person to be determined is determined to be the target person to be rewarded, the server apparatus 10 provides the person to be determined with the reward related to the hotel. By providing the reward to the user (for example, a hotel guest) who has engaged in a predetermined behavior in the facility surrounding the hotel, the user (tourist) will have an incentive to use the hotel and an incentive to engage in consumption behavior at the affiliated business operator in the vicinity. In other words, attractiveness of the hotel and the affiliated business operator in the vicinity of the hotel will increase, and more users (tourists) will use the hotel and the affiliated business operator. As a result, an economy of the hotel and an area around the hotel will be revitalized.

In addition, in the information processing system according to the first example embodiment, a reward is provided to a user who engages in behavior that does not burden on the environment, such as a user who travels by bicycle instead of traveling by private car, or a user who travels by shuttle bus. Alternatively, in the information processing system according to the first example embodiment, a reward is given to a user who purchases a food item that is close to its expiration date. In this way, social issue of building sustainable society can be solved by providing the reward to the user who behaves with consideration for the environment.

Figure 18:
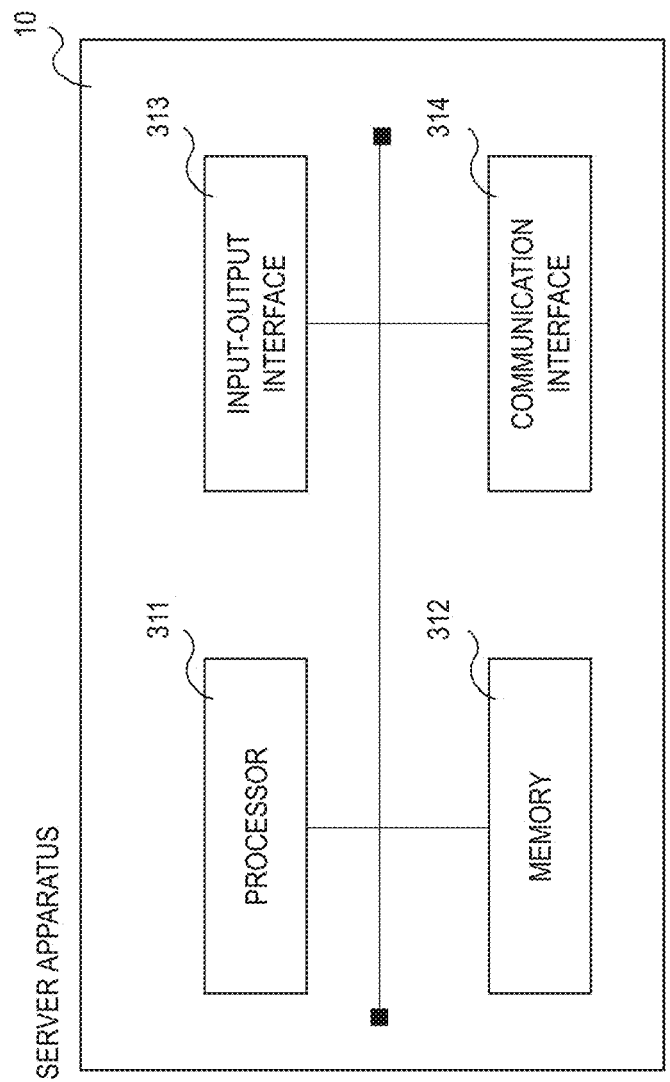
FIG. 18 is a diagram illustrating an example of a hardware configuration of the server apparatus of the present application.

Next, a hardware configuration of an individual apparatus that constitutes the information processing system will be described. FIG. 18 is a diagram illustrating an example of a hardware configuration of the server apparatus 10.

The server apparatus 10 can be configured by an information processing apparatus (a so-called computer) and has a configuration illustrated as an example in FIG. 18. For example, the server apparatus 10 includes a processor 311, a memory 312, an input-output interface 313, a communication interface 314, and so on. The components such as the processor 311 are connected to an internal bus, and so on so that these components can communicate with each other.

The hardware configuration of the server apparatus 10 is not limited to the configuration illustrated in FIG. 18. The server apparatus 10 may include hardware not illustrated or may be configured without the input-output interface 313 if desired. In addition, the number of components, such as the number of processors 311, included in the server apparatus 10 is not limited to the example illustrated in FIG. 18. For example, a plurality of processors 311 may be included in the server apparatus 10.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), or the like. The memory 312 stores an OS program, an application program, and various kinds of data.

The input-output interface 313 is an interface for a display device and an input device not illustrated. For example, the display device is a liquid crystal display or the like. For example, the input device is a device, such as a keyboard or a mouse, which receives user operations.

The communication interface 314 is a circuit, a module, or the like for performing communication with other apparatuses. For example, the communication interface 314 includes a NIC (Network Interface Card) or the like.

The functions of the server apparatus 10 are realized by various kinds of processing modules. The processing modules are realized, for example, by causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

As is the case with the server apparatus 10, the business operator terminal 20 can each be configured by an information processing apparatus, and the basic hardware configuration of the business operator terminal 20 is the same as that of the server apparatus 10. Thus, description of the basic hardware configuration of the business operator terminal 20 will be omitted. For example, the business operator terminal 20 may include a camera device for photographing the person to be determined.

The server apparatus 10 which is an information processing device includes a computer and can realize its functions by causing the computer to execute a program. In addition, the server apparatus 10 executes a control method of the server apparatus 10 by using this program.

[Variations]

The configurations, operations, and so on of the information processing system according to the above example embodiments are examples and do not limit the present system configuration, and so on.

The above example embodiment describes that biometric information of a user is registered in the server apparatus 10 when the user makes a reservation at a hotel. However, registration of biometric information is not limited to the time of making the reservation, for example, biometric information may be registered from a kiosk terminal or the like installed at an airport or the like in close proximity to the hotel.

It goes without saying that a reward provided to the hotel user described in the above example embodiment is an example and other rewards may be provided. For example, the server apparatus 10 may provide the hotel user with information on use of a facility around the hotel. For example, a user visits a restaurant to have lunch. The user operates the business operator terminal 20 (tablet) to select a menu item. At that time, the business operator terminal 20 acquires biometric information of the user (face image) and transmits the biometric information to the server apparatus 10. The server apparatus 10 identifies the person to be determined by biometric authentication and identifies the course of dishes that the person to be determined has made a reservation for (the course of dishes reserved via the hotel). The server apparatus 10 may recommend a lunch menu based on the identified course of dishes. For example, when a course of meat dishes is reserved for dinner, the server apparatus 10 recommends a menu of fish dishes.

Alternatively, the server apparatus 10 may determine the content to recommend in accordance with attributes of related persons (for example, family, friend, and acquaintances) of a person to be determined (the hotel user) identified by biometric authentication and the number of members in a group that includes the person to be determined. For example, the server apparatus 10 may recommend Chinese cuisine for a larger group and Japanese cuisine for a smaller group. Here, since the hotel needs to be aware of the number of dishes to be provided to the group of guests and the number of beds to be prepared, and so on, information on the composition of the group (for example, family composition) is input to the server apparatus 10 at the time of check-in. The server apparatus 10 can acquire information such as the attributes and number of members composing the group using the input information, and may utilize the information for providing a reward.

Figure 19:
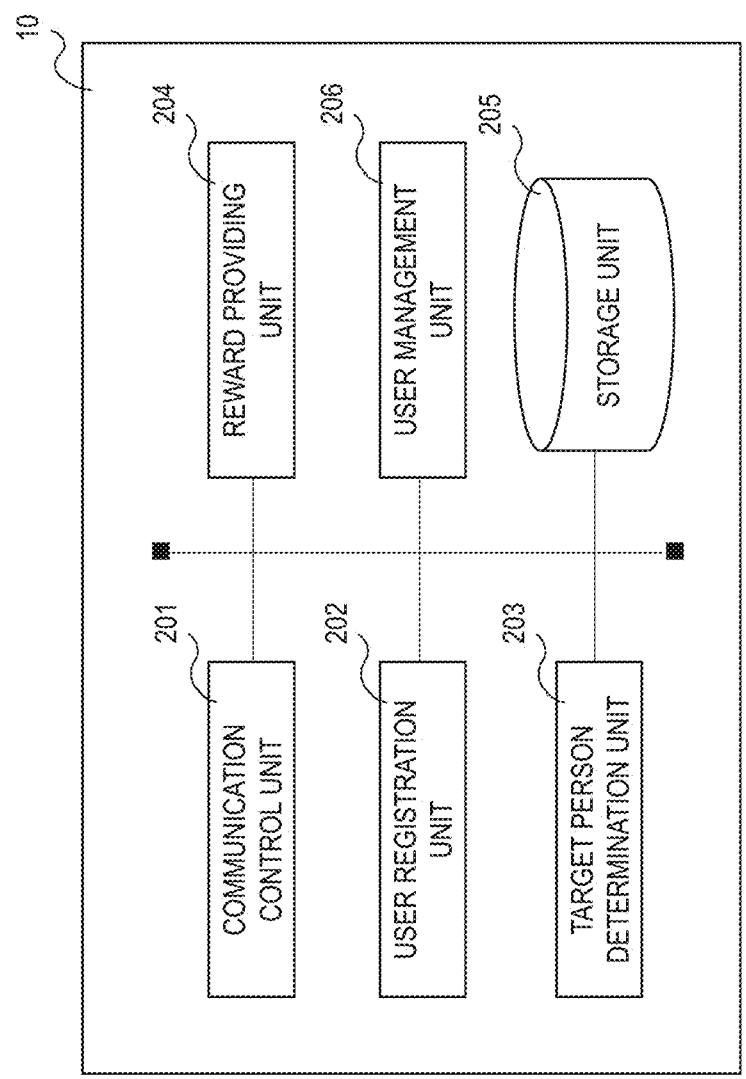
FIG. 19 is a diagram illustrating an example of a processing configuration of the server apparatus according to a variation of the present application.

The above example embodiment describes that the server apparatus 10 treats a user during the stay period, which includes the day of check-in and the day of check-out, as the hotel user. However, the server apparatus 10 may treat a user who has completed check-in as the hotel user and a user who has completed check-out as the non-hotel user. In this case, the server apparatus 10 includes a user management unit 206 as shown in FIG. 19. The user management unit 206 manages the user who has completed the check-in procedure and the check-out procedure using the user information database. For example, the user management unit 206 manages the status of the user using a flag. The target person determination unit 203 may refer to the flag in the user information database and determine whether the user is the hotel user or not in accordance with the status of the user.

Alternatively, the server apparatus 10 may treat a user as the hotel user several days before the start date of stay (check-in date) or may treat a user as the hotel user several days after the end date of stay (check-out date). In this case, the user management unit 206 may periodically or at predetermined timing refer to the user information database, determine the period during which each user is treated as the hotel user (the date and time to start treating a user as the hotel user and the date and time to end treating a user as the hotel user), and reflect this information in the user information database. The target person determination unit 203 may refer to the period reflected in the user information database and determine whether or not a person to be determined identified by a matching processing is the hotel user.

The server apparatus 10 may determine the period during which a user is treated as the above hotel user in accordance with reservation information (period of stay, grade of guest room, and so on) of the user. For example, the server apparatus 10 may determine the period of time that the server apparatus 10 treats a user as the above hotel user, giving preferential treatment to a user staying for a long period of time or a user staying in a high-grade guest room.

The server apparatus 10 may distinguish and manage users who have already checked in (checked-in users), users who are scheduled to check in on the start date of the stay (scheduled check-in users), and users who have completed check-out on the end date of the stay (completed check-out users). Furthermore, the server apparatus 10 may provide same rewards (services) to each user (checked-in users, scheduled check-in users, and checked-out users), or the server apparatus 10 may provide different rewards. For example, the server apparatus 10 may provide the reward to give preferential treatment to a user who has already checked in (a guest) over a user who is scheduled to check in and a user who has already checked out.

The above example embodiment describes that a reward is provided to the behavior of a person to be determined outside of a hotel (affiliated business operator of the hotel). However, the reward may be provided to behavior within the hotel by the person to be determined. For example, the server apparatus 10 may provide the reward to a user when the user requests to skip housekeeping at the time of the check-in procedure.

The behavior of a person to be determined who is the target person to be rewarded described in the above example embodiment is an example, and a reward may be provided to other behavior. For example, the reward may be provided to the person to be determined who uses a resort facility of a business operator that has a partnership relationship with the hotel. Alternatively, the reward may be provided to the person to be determined who uses a taxi operated by a business operator that has a partnership relationship with the hotel.

Furthermore, rewards to be provided to the target person to be rewarded described in the above example embodiment are only examples, and other rewards may be provided. For example, the reward related to transportation from a hotel to an airport or a station may be provided to the person to be determined. For example, the server apparatus 10 may issue a ticket for free use of a taxi, or the like, and transmit the ticket to the terminal 30 of a user.

The method of determining a reward described in the above example embodiment is only an example, and the reward may be determined by other method. For example, the server apparatus 10 may determine the reward to be provided to the target person to be rewarded based on a time zone, date and time, or the like. For example, the server apparatus 10 may select an upgraded dinner as the reward when it is before dinner time (for example, before 18:00), and may select a discount on the accommodation charge as the reward when it is after dinner time.

The server apparatus 10 may provide not only one type of reward, but also a combination of a plurality of types of rewards to the target person to be rewarded. For example, the server apparatus 10 may provide a discount on accommodation charge and an extension of check-out time as the reward to the target person to be rewarded.

The server apparatus 10 may provide the hotel user with a reward that will be applied to a future use of a hotel of the hotel user. In other words, the server apparatus 10 can encourage the user to stay at the hotel again (repeat use) by providing a reward to the user that can be used at the next time the user will stay at the hotel.

Note that the above example embodiment describes that the server apparatus 10 determines that a person to be determined is the "target person to be rewarded" when the person to be determined has made a payment exceeding a predetermined amount to the affiliated business operator. Here, the amount of payment to be determined as the target person to be rewarded may be the amount paid by the person to be determined at a single store, or may be the total amount paid to at least one or more affiliated business operators during the predetermined period. Furthermore, the predetermined period may be the same period as the stay period of the hotel user at the hotel, or may be a period in which a predetermined number of days are added before or after the stay period of the hotel user at the hotel. For example, when the stay period is "3 days," the total amount paid during "5 days", in which one day before and after each of the start date and end date of the stay period, may be the amount for determining that the hotel user is the target person to be rewarded.

The above example embodiment describes that the server apparatus 10 acquires behavior information from the business operator terminal 20 in order to grasp behavior of a person to be determined. At that time, the business operator terminal 20 acquires biometric information of the person to be determined after the behavior of the person to be determined is decided, but the business operator terminal 20 may acquire the biometric information before the behavior of the person to be determined is decided. For example, when the business operator terminal 20 is a terminal that sells a ticket (for example, a meal ticket), the business operator terminal 20 may takes a picture of a person when the business operator terminal 20 detects the person in front of the business operator terminal 20, and transmit the biometric information and behavior information to the server apparatus 10 after the person decided which ticket to purchase.

The above example embodiment describes that a person to be determined is identified using biometric authentication. However, identification of the person to be determined may be performed by other means. For example, the identification of the person to be determined may be performed using a two-dimensional code into which a terminal ID is converted. That is, instead of biometric information (face image), a user may register the two-dimensional code generated from the terminal ID, and so on, in the server apparatus 10, and have the business operator terminal 20 read the terminal ID. The business operator terminal 20 may transmit the acquired terminal ID (two-dimensional code) to the server apparatus 10. Furthermore, when it is necessary to identify the hotel user in a hotel, biometric authentication using biometric information may be used. In other words, biometric authentication may be used when a reward (service) is used in the hotel.

The above example embodiment describes a case in which the user information database is configured inside the server apparatus 10, but the database may be established in an external database server or the like. That is, some of the functions of the server apparatus 10 may be implemented in another server. More specifically, the "target person determination unit (target person determination means)", "reward providing unit (reward providing unit means)", and so on described above may be implemented in any device included in that includes the system.

While the data exchange between each apparatus (the server apparatus 10 and the business operator terminal 20) is not limited to any particular mode, data exchanged between these apparatuses may be encrypted. It is desirable that biometric information of a user and so on are transmitted and received between these apparatuses and encrypted data is transmitted and received in order to properly protect this information.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to an information processing system or the like that provides a reward to a user who visits an affiliated business operator.

A part or the entirety of the example embodiments described above may be described as in the following supplementary notes, but is not limited to the followings.

[Supplementary Note 1]

A system, including:

a server apparatus that stores biometric information of at least one or more users who plan to use a hotel; and a business operator terminal that is managed by an affiliated business operator that has partnership relationship with the hotel, and transmits to the server apparatus a user behavior notification including biometric information and behavior information of a person to be determined, wherein the server apparatus identifies the person to be determined among the at least one or more users by a matching processing using the biometric information included in the user behavior notification and the stored biometric information, wherein the server apparatus determines whether the identified person to be determined is a hotel user who will use the hotel after a predetermined time or who used the hotel before a predetermined time based on a time of processing of the user behavior notification, wherein the server apparatus determines whether the identified person to be determined is a target person to be rewarded based on the behavior information, and wherein the server apparatus provides the person to be determined with a reward related to the hotel when the person to be determined is the hotel user and the target person to be rewarded.

[Supplementary Note 2]

The system according to supplementary note 1, wherein the server apparatus stores biometric information and reservation information regarding a reservation of the hotel of the at least one or more users, and determine the reward to be provided to the target person to be rewarded based on the reservation information of the identified person to be determined.

[Supplementary Note 3]

The system according to supplementary note 1 or 2, wherein the hotel user is a guest of the hotel or a user of a facility of the hotel.

[Supplementary Note 4]

The system according to any one of supplementary notes 1 to 3, wherein the server apparatus determines whether or not the person to be determined is the target person to be rewarded based on an amount of money that the person to be determined pays when purchasing a product or receiving a service from the affiliated business operator.

[Supplementary Note 5]

The system according to any one of supplementary notes 1 to 4, wherein the server apparatus determines whether or not the person to be determined is the target person to be rewarded based on a type of product purchased by the person to be determined from the affiliated business operator.

[Supplementary Note 6]

The system according to supplementary note 5, wherein the server apparatus determines that the person to be determined is the target person to be rewarded when the person to be determined has purchased a predetermined ecology-related product.

[Supplementary Note 7]

The system according to any one of supplementary notes 1 to 6, wherein the server apparatus determines that the person to be determined is the target person to be rewarded when the person to be determined has received a bicycle rental from the affiliated business operator.

[Supplementary Note 8]

The system according to any one of supplementary notes 1 to 7, wherein the server apparatus determines that the person to be determined is the target person to be rewarded when the person to be determined has used a shuttle bus.

[Supplementary Note 9]

The system according to any one of supplementary notes 1 to 8, wherein the server apparatus provides at least one of a discount on accommodation charge, an extension of check-out time, an upgrade of guest room, a free drink in guest room, an upgrade of food provided and an addition of amenities as the reward to the target person to be rewarded.

[Supplementary Note 10]

The system according to any one of supplementary notes 1 to 9, wherein the server apparatus provides a point for a behavior of the target person to be rewarded and determines the reward to be provided in accordance with a total amount of the provided points.

[Supplementary Note 11]

The system according to any one of supplementary notes 1 to 10, wherein the biometric information is a face image or a feature value generated from the face image.

[Supplementary Note 12]

A server apparatus, including:
  a storage unit that stores biometric information of at least one or more users who plan to use a hotel;
  a receiving unit that receives a user behavior notification including biometric information and behavior information of a person to be determined from a business operator terminal that is managed by an affiliated business operator having partnership relationship with the hotel;
  a target person determination unit that identifies the person to be determined among the at least one or more users by a matching processing using the biometric information included in the user behavior notification and the stored biometric information, determines whether the identified person to be determined is a hotel user who will use the hotel after a predetermined time or who used the hotel before a predetermined time based on a time of processing of the user behavior notification and determines whether the identified person to be determined is a target person to be rewarded based on the behavior information; and
  a reward providing unit that provides the person to be determined with a reward related to the hotel when the person to be determined is the hotel user and the target person to be rewarded.

[Supplementary Note 13]

A control method of a server apparatus, the control method including: storing biometric information of at least one or more users who plan to use a hotel;
  receiving a user behavior notification including biometric information and behavior information of a person to be determined from a business operator terminal that is managed by an affiliated business operator having partnership relationship with the hotel;
  identifying the person to be determined among the at least one or more users by a matching processing using the biometric information included in the user behavior notification and the stored biometric information;
  determining whether the identified person to be determined is a hotel user who will use the hotel after a predetermined time or who used the hotel before a predetermined time based on a time of processing of the user behavior notification;
  determining whether the identified person to be determined is a target person to be rewarded based on the behavior information; and
  providing the person to be determined with a reward related to the hotel when the person to be determined is the hotel user and the target person to be rewarded.

[Supplementary Note 14]

A computer-readable storage medium storing a program causing a computer mounted on a server apparatus that stores biometric information of at least one or more users who plan to use a hotel to perform processing for:
  receiving a user behavior notification including biometric information and behavior information of a person to be determined from a business operator terminal that is managed by an affiliated business operator having partnership relationship with the hotel;
  identifying the person to be determined among the at least one or more users by a matching processing using the biometric information included in the user behavior notification and the stored biometric information;
  determining whether the identified person to be determined is a hotel user who will use the hotel after a predetermined time or who used the hotel before a predetermined time based on a time of processing of the user behavior notification;
  determining whether the identified person to be determined is a target person to be rewarded based on the behavior information; and
  providing the person to be determined with a reward related to the hotel when the person to be determined is the hotel user and the target person to be rewarded.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST 10 server apparatus
20 business operator terminal
30 terminal
101 server apparatus
102 business operator terminal
201 communication control unit
202 user registration unit
203 target person determination unit
204 reward providing unit
205 storage unit
206 user management unit
301 communication control unit
302 biometric information acquisition unit
303 task execution unit
304 storage unit
311 processor
312 memory
313 input-output interface
314 communication interface

What is claimed is:

1. A system, comprising:
a server apparatus configured to store biometric information of one or more users; and
an operator terminal that is configured to transmit to the server apparatus, a user behavior notification comprising biometric information and behavior information of a person to be determined, the biometric information comprising fingerprint information or face information of the person to be determined, and the behavior information indicating information about a transaction involving the person to be determined, wherein the face information comprises at least one of eye information, nose information, or mouth information,
wherein the server apparatus is configured to identify the person to be determined among the one or more users by matching processing using the biometric information included in the user behavior notification and the stored biometric information, the matching processing comprising:
extracting a plurality of feature values from the biometric information to generate a first feature vector;
matching the first feature vector against a plurality of feature vectors stored in a user information database by calculating a similarity between the first feature vector and the plurality of feature vectors;
determining that the matching processing is successful between the first feature vector and a second feature vector, from among the plurality of feature vectors, based on a similarity between the first feature vector and the second feature vector exceeding a predetermined value; and
based on the matching processing being successful, identifying a user associated with the second feature vector as the person to be determined,
wherein the server apparatus is configured to store reservation information regarding hotel reservations of the one or more users, and to determine, based on the reservation information, whether the identified user corresponds to a target person who will use a hotel after a predetermined time or who used the hotel before a predetermined time based on a time of processing of the user behavior notification, and
wherein the server apparatus is configured to provide, based on the behavior information and the reservation information, a change to a reservation of the target person at the hotel.

2. The system according to claim 1, wherein the hotel user is a guest of the hotel or a user of a facility of the hotel.

3. The system according to claim 1, wherein the server apparatus is configured to determine whether the person to be determined is the target person based on an amount of money that the person to be determined pays when purchasing a product or receiving a service from an operator of the operator terminal.

4. The system according to claim 1, wherein the server apparatus determines whether the person to be determined is the target person based on a type of product purchased by the person to be determined from an operator of the operator terminal.

5. The system according to claim 4, wherein the server apparatus is configured to determine that the person to be determined is the target person based on the person to be determined purchasing an ecology-related product.

6. The system according to claim 1, wherein the server apparatus is configured to determine that the person to be determined is the target person based on determining that the person to be determined has rented a bicycle from an operator of the operator terminal.

7. The system according to claim 1, wherein the server apparatus is configured to determine that the person to be determined is the target person when the person to be determined has used a shuttle bus.

8. The system according to claim 1, wherein the server apparatus is configured to change, based on the behavior information and the reservation information, the reservation of the target person to provide the target person at least one of a discount on accommodation charge, an extension of check-out time, an upgrade of guest room, a free drink in guest room, an upgrade of food provided and an addition of amenities.

9. The system according to claim 1, wherein the server apparatus is configured to increment, in the user information database, a total amount of points associated with the target person, based on a behavior of the target person.

10. A server apparatus, comprising:
at least one memory storing instructions; and
at least one processor configured to execute the instructions to:
store biometric information of one or more users;
store reservation information regarding hotel reservations of the one or more users;
receive, from an operator terminal, a user behavior notification comprising biometric information and behavior information of a person to be determined, the biometric information comprising fingerprint information or face information of the person to be determined, and the behavior information indicating information about a transaction involving the person to be determined, wherein the face information comprises at least one of eye information, nose information, or mouth information;

identify the person to be determined among the one or more users by matching processing using the biometric information included in the user behavior notification and the stored biometric information, the matching processing comprising:

extracting a plurality of feature values from the biometric information to generate a first feature vector;

matching the first feature vector against a plurality of feature vectors stored in a user information database by calculating a similarity between the first feature vector and the plurality of feature vectors;

determining that the matching processing is successful between the first feature vector and a second feature vector, from among the plurality of feature vectors, based on a similarity between the first feature vector and the second feature vector exceeding a predetermined value; and based on the matching processing being successful, identifying a user associated with the second feature vector as the person to be determined;

determine, based on the reservation information, whether the identified user corresponds to a target person who will use a hotel after a predetermined time or who used the hotel before a predetermined time based on a time of processing of the user behavior notification; and provide, based on the behavior information and the reservation information, a change to a reservation of the target person at the hotel.

11. A control method of a server apparatus, the method comprising:

storing biometric information of one or more users;

storing reservation information regarding hotel reservations of the one or more users;

receiving, from an operator terminal, a user behavior notification comprising biometric information and behavior information of a person to be determined, the biometric information comprising fingerprint information or face information of the person to be determined, and the behavior information indicating information about a transaction involving the person to be determined, wherein the face information comprises at least one of eye information, nose information, or mouth information;

identifying the person to be determined among the one or more users by matching processing using the biometric information included in the user behavior notification and the stored biometric information, the matching processing comprising:

extracting a plurality of feature values from the biometric information to generate a first feature vector, the plurality of feature values corresponding to face information or fingerprint information of the person to be determined, wherein the face information comprises at least one of eye information, nose information, or mouth information;

matching the first feature vector against a plurality of feature vectors stored in a user information database by calculating a similarity between the first feature vector and the plurality of feature vectors;

determining that the matching processing is successful between the first feature vector and a second feature vector, from among the plurality of feature vectors, based on a similarity between the first feature vector and the second feature vector exceeding a predetermined value; and based on the matching processing being successful, identifying a user associated with the second feature vector as the person to be determined;

determining, based on the reservation information, whether the identified user corresponds to a target person who will use a hotel after a predetermined time or who used the hotel before a predetermined time based on a time of processing of the user behavior notification; and providing, based on the behavior information and the reservation information, a change to a reservation of the target person.

12. The system according to claim 1, wherein the similarity between the feature vector and the plurality of feature vectors is calculated using at least one of a chi-squared distance and a Euclidean distance.

13. The system according to claim 1, wherein the change to the reservation comprises at least one of: a change of a hotel room, a change in provided food, a change in provided amenities, or a change of access to hotel facilities.

* * * * *